United States Patent
Sri-Jayantha et al.

(10) Patent No.: US 7,119,511 B2
(45) Date of Patent: Oct. 10, 2006

(54) SERVO SYSTEM FOR A TWO-DIMENSIONAL MICRO-ELECTROMECHANICAL SYSTEM (MEMS)-BASED SCANNER AND METHOD THEREFOR

(75) Inventors: Sri M. Sri-Jayantha, Ossining, NY (US); Hien Dang, Nanuet, NY (US); Arun Sharma, New Rochelle, NY (US); Evangelos S. Eleftheriou, Zurich (CH); Mark A. Lantz, Zurich (CH); Charalampos Pozidis, Gattikon (CH)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 10/411,136

(22) Filed: Apr. 11, 2003

(65) Prior Publication Data

US 2004/0204776 A1    Oct. 14, 2004

(51) Int. Cl.
*G05B 1/06*    (2006.01)
(52) U.S. Cl. ............. 318/638; 318/560; 318/568.18; 318/649; 318/677
(58) Field of Classification Search ............... 318/359, 318/560, 574, 610, 625, 649, 638; 359/202; 360/69, 88
See application file for complete search history.

(56) References Cited

U.S. PATENT DOCUMENTS

| 4,453,084 A * | 6/1984 | Brouwer ............... 250/202 |
|---|---|---|
| 4,679,103 A * | 7/1987 | Workman ............ 360/78.07 |
| 4,816,941 A * | 3/1989 | Edel et al. ............ 360/78.12 |
| 4,879,612 A | 11/1989 | Freeze et al. |
| 4,994,661 A | 2/1991 | Majewski et al. |
| 5,210,410 A * | 5/1993 | Barrett ................... 250/234 |
| 5,453,616 A * | 9/1995 | Wakiyama .............. 250/306 |
| 5,751,585 A * | 5/1998 | Cutler et al. ............ 700/161 |
| 5,757,149 A * | 5/1998 | Sato et al. ............. 318/135 |
| 5,757,585 A * | 5/1998 | Aoyagi et al. ......... 360/234.5 |
| 5,798,927 A * | 8/1998 | Cutler et al. ........... 700/188 |
| 5,869,945 A * | 2/1999 | Ha et al. ................ 318/600 |
| 6,563,666 B1 * | 5/2003 | LaPanse ............... 360/78.09 |
| 6,762,571 B1 * | 7/2004 | Min et al. ............... 318/135 |
| 6,845,190 B1 * | 1/2005 | Smithwick et al. ........ 385/25 |
| 2002/0021245 A1 * | 2/2002 | Lin et al. ............. 342/357.14 |
| 2003/0206505 A1 * | 11/2003 | Hsu et al. ............. 369/44.35 |

FOREIGN PATENT DOCUMENTS

WO    WO 03/021127 A2    3/2003

OTHER PUBLICATIONS

P. Vettiger and G. Binning, "The Nanodrive Project," Scientific American, pp. 47-53, Jan. 2003.

P. Vettiger et al., "The Millipede"—More than one thousand tips for future AFM data storage, IBM J. Research and Development, vol. 44, No. 3, pp. 323-340, May 2000.

MTI Instruments Inc., Albany, NY, USA (www.MTIinstruments.com).

(Continued)

*Primary Examiner*—Lincoln Donovan
*Assistant Examiner*—Erick Glass
(74) *Attorney, Agent, or Firm*—Jesse L. Abzug, Esq.; McGinn IP Law Group, PLLC

(57) ABSTRACT

A servo control system for a micro-electromechanical systems (MEMS)-based motion control system (and method therefor), includes a motion generator having an inherent stiffness component.

7 Claims, 25 Drawing Sheets

OTHER PUBLICATIONS

S. Gupta and L. Hasdorff, Fundamentals of Automatic Control, John Wiley & Sons, Inc., p. 86, 1970.

R.F. Stengel, Stochastic Optimal Control, John Wiley & Sons, Inc., Chapter 4, 1986.

M. Sri-Jayantha and R. Stengel, "Determination of nonlinear aerodynamic coefficient using the Estimation-Before-Modeling Method," Journal of Aircraft, vol. 25, No. 9, pp. 796-804, Sep. 1988.

P. Vettiger and G. Binning, "The Nanodrive Project," Scientific American, pp. 47-53, Jan. 2003.

P. Vettiger et al., "The Millipede"—More than one thousand tips for future AFM data storage, IBM J. Research and Development, vol. 44, No. 3, pp. 323-340, May 2000.

MTI Instruments Inc., Albany, NY, USA (www.MTIinstruments.com).

S. Gupta and L. Hasdorff, Fundamentals of Automatic Control, John Wiley & Sons, Inc., p. 86, 1970.

R.F. Stengel, Stochastic Optimal Control, John Wiley & Sons, Inc., Chapter 4, 1986.

* cited by examiner

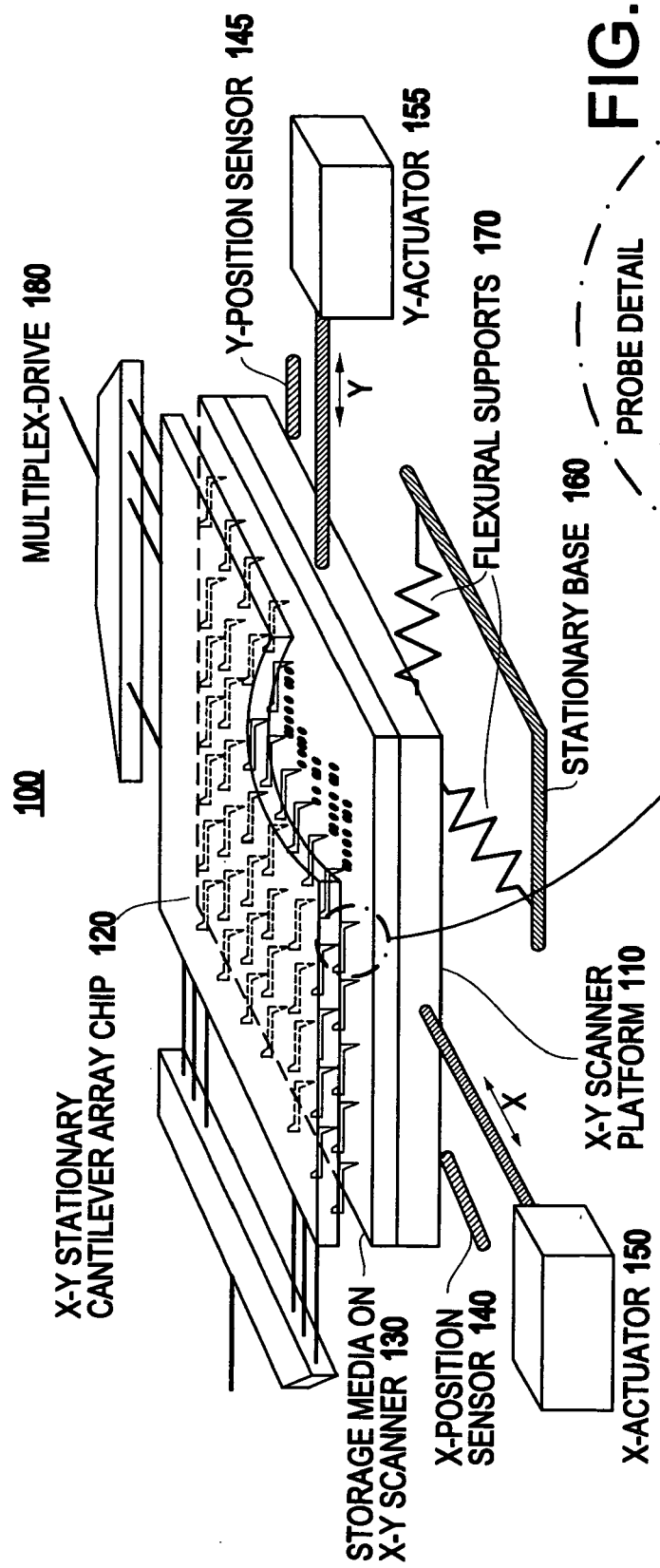

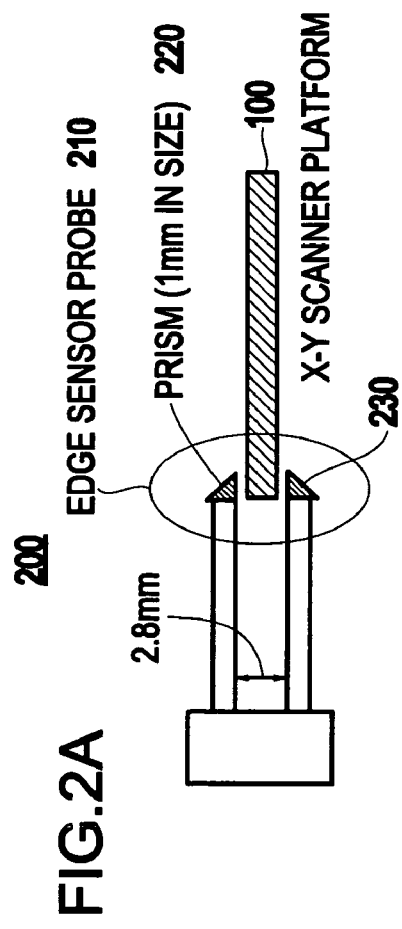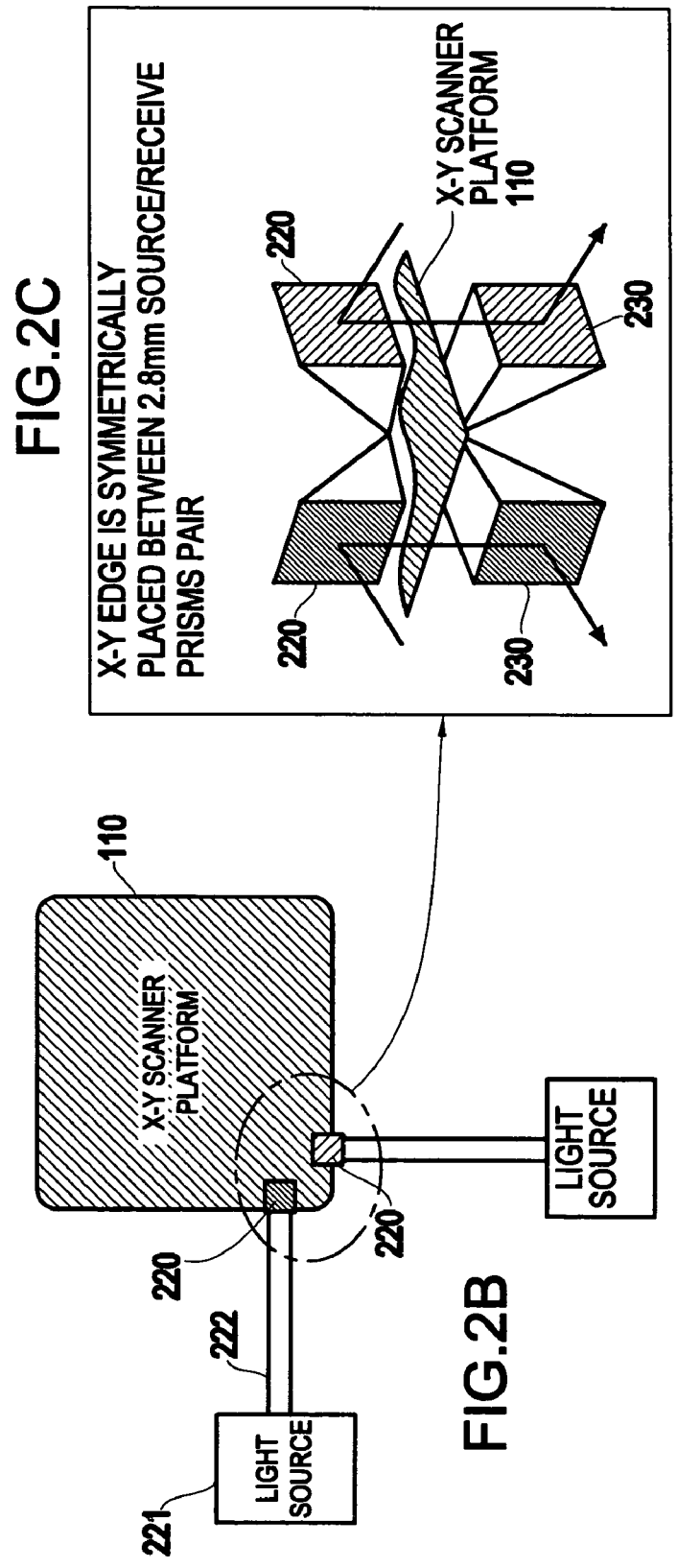

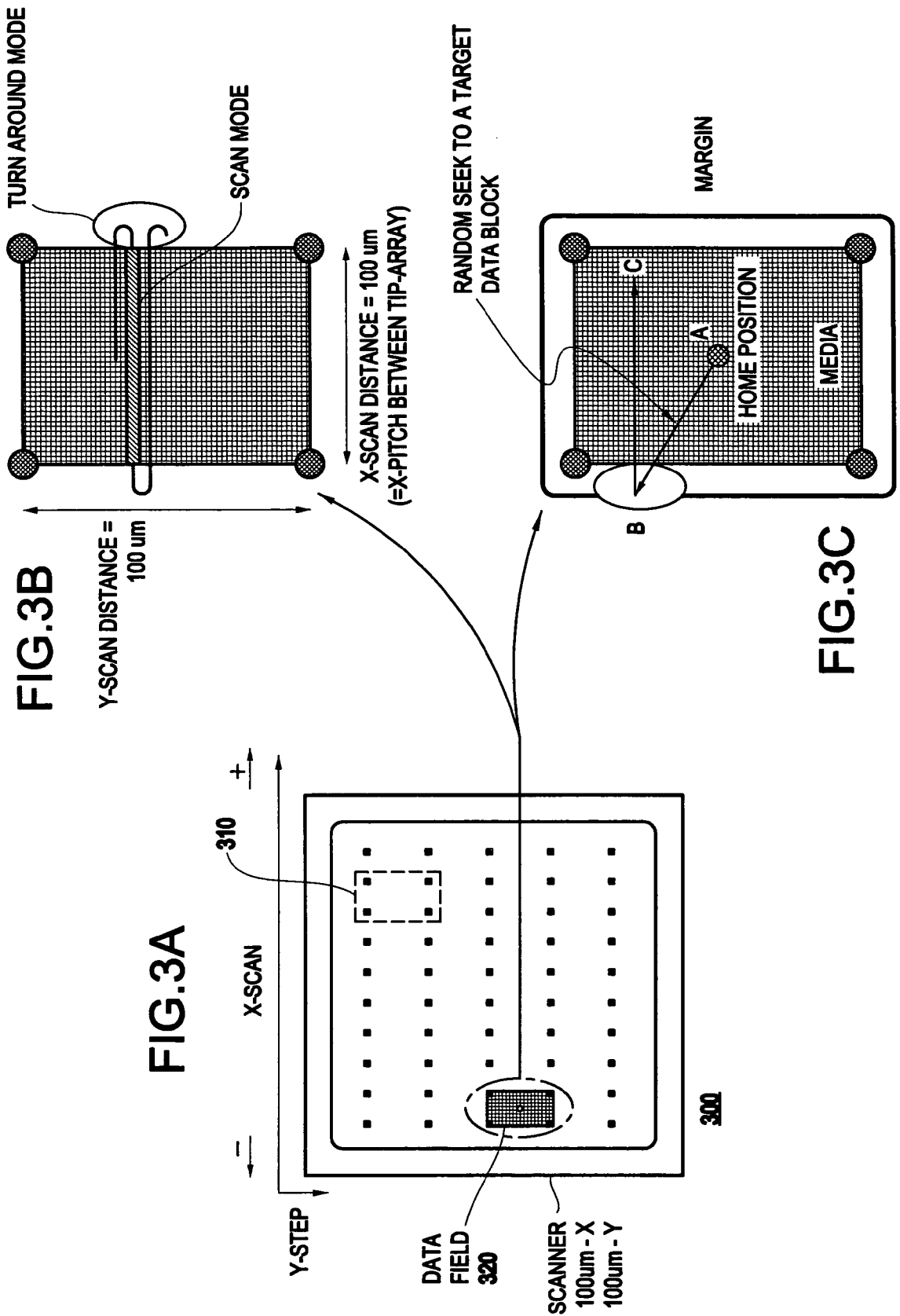

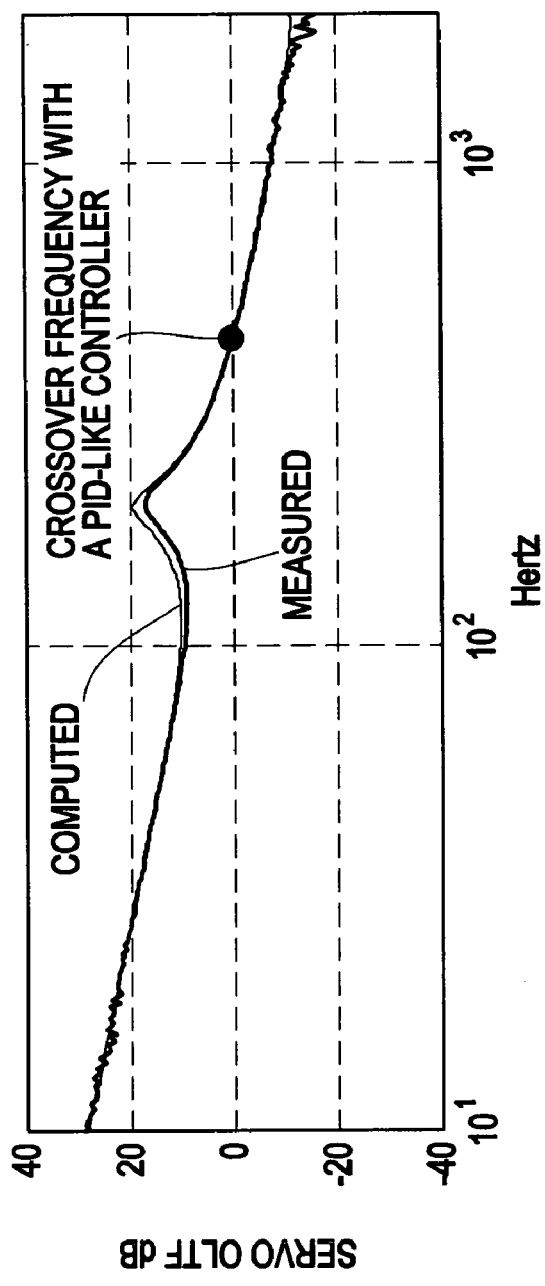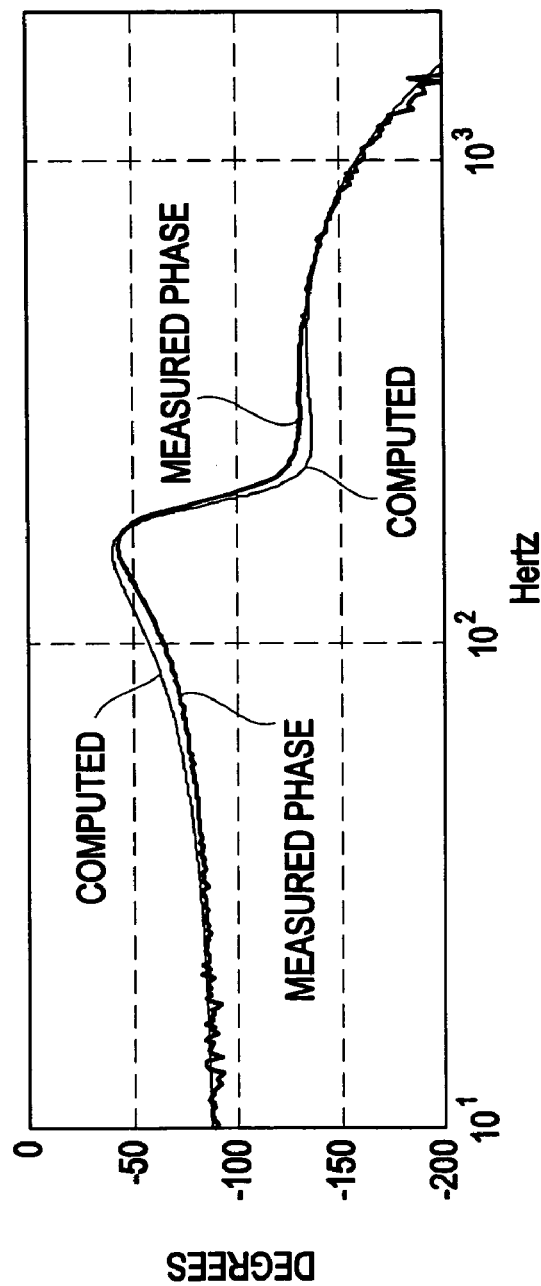

SERVO SYSTEM FOR A TWO-DIMENSIONAL MICRO-ELECTROMECHANICAL SYSTEM (MEMS)-BASED SCANNER AND METHOD THEREFOR

BACKGROUND OF THE INVENTION

1. Field of the Invention

The present invention generally relates to a disk drive, and more particularly to a servo system for a two-dimensional MEMS-based scanner, and a method for use with the servo system.

2. Description of the Related Art

A micro-electromechanical system (MEMS) can be utilized to generate nanometer-scale motion. While providing nanometer-scale, yet precise, positioning capability (e.g., 5 nm 1-sigma error), it is advantageous to build a capability to span micrometer-scale areas (e.g., 100 μm square range) in the X-Y plane. The larger span range enhances a scanner's application potential. A key application of such a scanner is in the area of atomic force microscopy (AFM)-based storage applications, such as in a system disclosed in Vettiger and G. Binning, "The Nanodrive Project," *Scientific American*, pp. 47–53, January 2003, and PCT Publication No. WO 03/021127 A2.

In this system, a polymer media for recording information is supported by a scanner. Unlike a friction-free actuator system, such as the one found in a disk drive actuator, a MEMS-based scanner is dominated by strong stiffness-producing flexural elements that provide X-Y freedom for movement. However, the presence of significant stiffness in the actuator system is shown to produce steady position error with respect to a ramp-reference trajectory in scan mode, and also suboptimal seek motion to a target track prior to a scan motion.

Thus, a new servo architecture is needed to overcome the effect of resistance generated by a system of flexural elements (i.e., that are integral to a MEMS-based scanner) so that two-dimensional seek and track-following-scan performances are competitively achieved.

SUMMARY OF THE INVENTION

In view of the foregoing and other problems, drawbacks, and disadvantages of the conventional methods and structures, an exemplary purpose of the present invention is to provide a new servo architecture (and method therefor) which overcomes the effect of resistance generated by a system of flexural elements (i.e., that are integral to a MEMS-based scanner) so that two-dimensional seek and track-following-scan performances are achieved.

In a first exemplary aspect of the present invention, a servo control system for a micro-electromechanical systems (NEMS)-based motion control system, includes a motion generator having an inherent stiffness component.

In a second exemplary aspect of the present invention, a servo control system for a micro-electromechanical systems (NEMS)-based motion control system, includes a scanner having an inherent stiffness, and a feedforward mechanism operatively coupled to the scanner for feedforwarding a component for counterbalancing the stiffness of the scanner.

In a third exemplary aspect of the present invention, a servo controller for controlling movement of a scanner, includes a servo unit for generating a first-axis motion and a second-axis motion under a track-follow-scan mode and a turn-around mode. A scan rate is programmable by choosing an appropriate slope for a ramp trajectory for the servo unit when generating the first-axis motion.

In a fourth exemplary aspect of the present invention, a method of storage-centric applications includes performing a two-dimensional seek at a first speed and a first precision, and performing a one-dimensional scan at a second speed and a second precision. The first speed is higher than the second speed, and the first precision is less than the second precision.

In a fifth exemplary aspect of the present invention, a servo control system for a micro-electromechanical (MEMS)-based motion control system, includes a proportional-integral-derivative (PID) controller including a type-1 system. The controller has a steady position error due to a ramp motion.

In a sixth exemplary aspect of the present invention, a method of controlling a scanner in a microelectromechanical system (MEMS)-based motion control device, includes generating a velocity profile for each X-seek, and managing a stiffness of the scanner.

With the unique and unobvious features of exemplary embodiments of the invention, numerous exemplary advantages accrue. Indeed, the exemplary embodiments of the invention described herein develop a servo structure that augments a conventional control structure, including a proportional-integral-derivative (PID) type, so that the significant stiffness characteristics of a MEMS-based scanner are intelligently neutralized through an exemplary feed forward control method.

Thus, the invention provides several examples of a new servo architecture which overcomes the effect of resistance generated by a system of flexural elements (i.e., that are integral to a MEMS-based scanner) so that two-dimensional seek and track-following-scan performances are achieved.

The present invention specifically addresses a plurality of functions of a scanner developed for an AFM-based storage application, including a track-following-scan and a two-dimensional seek.

BRIEF DESCRIPTION OF THE DRAWINGS

The foregoing and other purposes, aspects and advantages will be better understood from the following detailed description of a preferred embodiment of the invention with reference to the drawings, in which:

FIG. 1A illustrates elements of an AFM-based storage device 100 with an X-Y scanner 110;

FIG. 1B illustrates details of a probe 120 for use with the AFM-based storage device 100;

FIGS. 2A–2C illustrate an optical position sensor 200 employed in a test configuration;

FIGS. 3A–3C illustrate seek and scan trajectories and their components;

FIGS. 7A–7B respectively illustrate a measured and a computed open loop transfer function (OLTF);

DETAILED DESCRIPTION OF PREFERRED EMBODIMENTS OF THE INVENTION

Figure 4:
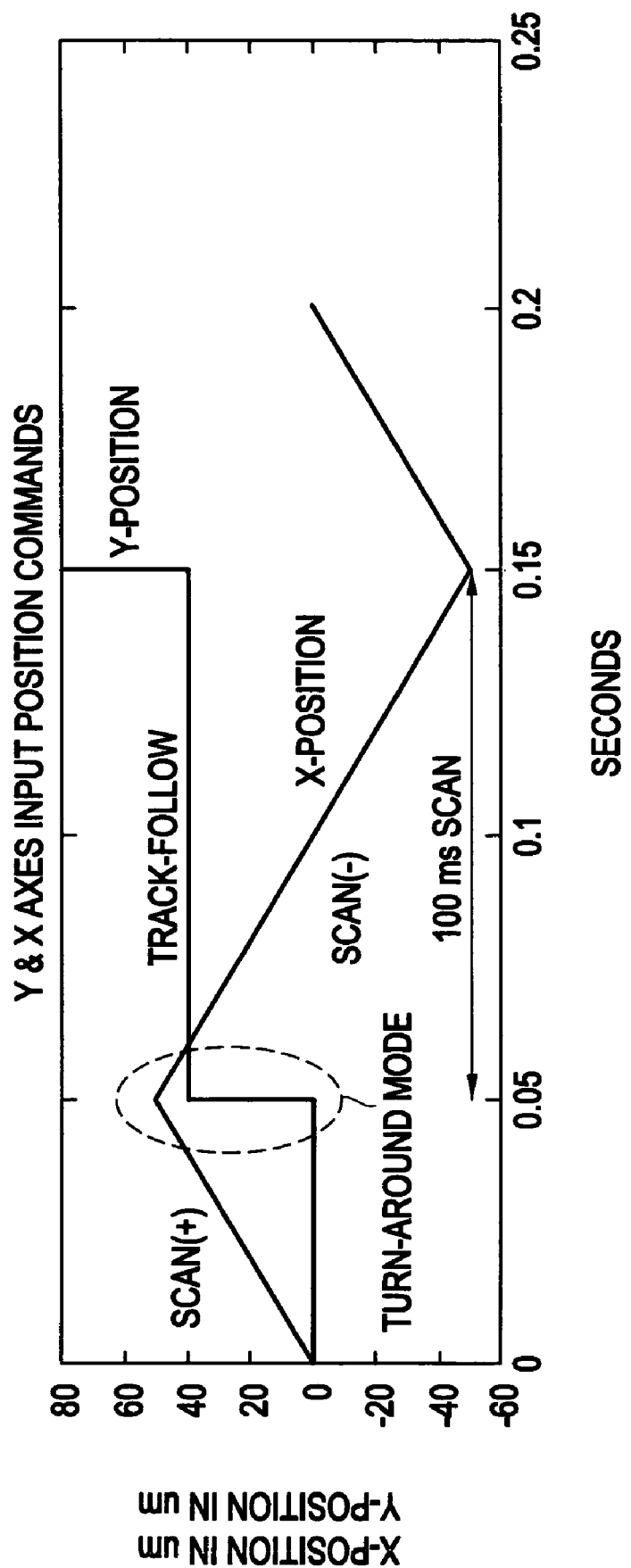
FIG. 4 illustrates scan mode reference trajectories.

Referring now to the drawings, and more particularly to FIGS. 1A–19, there are shown preferred embodiments of the method and structures according to the present invention.

Preferred Embodiment

Among several emerging non-volatile storage technologies, AFM-based storage promises to deliver more than 1 terabit/sq.inch areal density in a compact form factor device.

According to published information, 30–40 nm-sized bit indentations of similar pitch size have been made by a single cantilever-tip assembly on a 50 nm thick polymethylmetacrylate (PMMA) layer (e.g., see P. Vettiger et. el., "The Millipede"-More than one thousand tips for future AFM data storage," *IBM J. Research and Development*, Vol. 44, No. 3, pp. 323–340, May 2000).

An integrated view of such a system 100 is shown in FIG. 1A. The system 100 includes an X-Y scanner platform 110, an X-Y stationary cantilever array chip 120 having a plurality of cantilever tip array/probe assemblies (shown in greater detail in FIG. 1B), a storage media 130 on the X-Y scanner 110, an X-position sensor 140, a Y-position sensor 145, an X-actuator 150, a Y-actuator 155, a stationary base 160, flexural supports 170 which provide freedom of motion, and a multiplex-driver 180.

As mentioned above, the details of the probe are as exemplarily shown in FIG. 1B. The probe includes a resistive heater 121 coupled between two parallel beams (unreferenced) having a probe tip coupled thereto (unreferenced). The probe tip is stationary and the storage medium to be read/written to includes pits 122 (representing information in a manner well-known in the art) and is movable under the probe. It is noted that the pits are formed in a polymer layer 123 formed on a substrate 124 of the chip 125. The polymer under the tip (nanometer scale) is sensitive to the temperature radiation coming from the probe tip. Thus, for writing to the storage medium (e.g., whenever a pit is desired), a current is sent to the probe's heater element which heats the probe, and a pit (indentation) is formed on the polymer.

For reading, the probe is brought close to the polymer, and because of the presence of a pit (corresponding to a bit), the amount of heat pulled out of the resistive element is less than the adjacent flat area (e.g., the nonpit area). Thus, the change of resistance can be detected, thereby representing the information therein. Hence, with such a system, high areal density is achieved. Indeed, many thousands of such probes may be included in an array (e.g., 32×32), thereby allowing reading and writing simultaneously. Preferably, the probe is fixed and the polymer/substrate is movable by means of the X-Y scanner system.

Each cantilever-tip/probe assembly 120 is associated with a corresponding data field. (Strategically selected data fields may be assigned to provide X-Y position information for a feedback servo loop as discussed below. Thus, high data rates are achieved by the parallel operation of large, two-dimensional arrays (e.g., 32×32) of cantilever-tip (referred to as tip-array) assemblies 120.

Time-multiplexed electronics control the read/write/erase functions needed in this storage device by activating the cantilever-tip system 120. In the system shown in FIGS. 1A–1C, the tip-array 120 is built and assembled on the stationary chip 125, whereas the storage media (PMMA) 130 is deposited on the scanner 110 that is programmed to move in an X-Y direction relative to the tip-array 120.

Sensing the position of the scanner 110 relative to the tip-array 120 allows achieving reliable storage functions. Thermal expansion and material creep over a long period of time can render a nanometer-scale storage system useless, unless accurate position-sensing and servo control functions are embedded in the overall system design. In a commercialized version of the Millipede storage system, a position sensor technology is embedded within the system.

To validate the present invention, an exemplary optical sensor is employed that is shown in FIGS. 2A–2C. The sensor system 200 includes an edge sensor probe 210, and was custom built, for example, by MTI Instruments (e.g., see MTI Instruments Inc., Albany, N.Y., USA (www.MTIinstruments.com), employs a light beam transmitted by a light source 221 through an optical fiber 222 to shine a light at the movable edge of the MEMS.

The light beam through the optical fiber 222 is deflected by 90 degrees using a miniature (e.g., 1 mm) prism structure including sets of upper and lower prisms 220, 230, respectively.

In operation, the light beam from a light source 221 that passes over a moveable edge is captured by a prism of the second set of prisms 230 (e.g., a lower prism), deflected by another 90 degrees, and is transmitted back to a receiving portion of the sensor electronics. The amount of light received in proportion to the light sent forms the basis for the voltage output of the edge sensor 210, and the voltage is linearly correlated to the location of the edge.

More specifically, the amount of light overlapping the prism indicates the position of the sensor. If the prism is completely blocked by the X-Y scanner platform, then no signal is returned, whereas if the prism is only 50 percent overlapping the X-Y scanner platform 110, then only 50 percent of the light is received, and a signal representing the same can be output.

Having discussed a way to sense the scanner motion, it is noted that read/write/erase (referred to as R/W) operations require two broadly different position control capabilities as depicted in FIGS. 3A–3C, including a 2-dimensional random seek and track-follow-scan.

FIGS. 3B and 3C define one of the several possible geometrical layouts for data recording where motion along a Cartesian coordinate system 300 is shown. The dots 310 in FIG. 3A signify the corner of the boundaries of each data field corresponding to each probe. Also shown is data field 320.

As shown in FIG. 3C, a scanner with no control force applied to it (power off) (i.e., a relaxed mode) will initially rest at a "home position" denoted by Location-A in FIG. 3C.

Under active operation, for example, when access to a data block 320 is required (for a read or a write), the scanner must be moved from Location-A to Location-B in two dimensions and preferably in minimum time. The X-seek is nominally identical for all data blocks, whereas the Y-seek is random.

Once Location-B is reached (e.g., through the random seek to a target data block), the scanner must come to a stop, and change its velocity vector to move along a track in scan mode (with scan speed) towards Location-C, where the beginning of a data block is located. For long data records, the scanner must be able to reach the end of a track along the {+x} axis and then turn around (e.g., turn-around mode) and execute a reverse direction scan along the {−x} axis, as shown in FIG. 3B.

Thus, from location A-B, the scanner will move at seek speed (e.g., in two dimensions X, Y), and from location B-C the scanner will move at scan speed (in one dimension X) to scan the track C.

It is noted that, as shown in FIG. 3B, it is desirable to minimize the "overshoot" (e.g., the margin area at location B of the data block needed for the scanner to turn around) of the scanner during its turnaround scan mode, thereby to increase the density of the chip and minimize the amount of wasted polymer space.

The scanner developed for this application has the freedom to move along X and Y Cartesian coordinates independently. Thus, two distinct position sensors and two feedback servo loops controlling two electromagnetic actuators, schematically shown in FIG. 1, are employed to develop the disclosed invention. It is noted that, in FIG. 1A, the freedom to move along X-Y coordinates is in reality provided by a complex system of flexures (details not shown), schematically represented by a single "spring" element for each degree of freedom of motion.

An industry-proven proportional-integral-derivative (PID) positioning servo system is a candidate controller for the MEMS scanner, designed for the storage application. A characteristic PID controller transfer function, for example in analog form, is represented by the following expression:

$$\text{Controller (Output/Input)} = (k_P + k_D s + k_I/s) \quad (1)$$

where gains $k_P$, $k_D$, and $k_I$ are proportional, derivative and integral gains, and 's' is the Laplace transform operator. The parameterization process to compute the gains is well known in the field. A control system designer would use a dynamic model of the scanner and would derive the gain values to achieve an "optimum" design.

An integrated scanner/servo system is required to perform three critical tasks.

First, it must move the scanner along the X and Y coordinates to the vicinity of a target track (Location-B in FIG. 3C) in a minimum time using a velocity servo in a seek mode. To facilitate a robust and reliable seek to a target track, a desired velocity profile is typically stored in memory and a velocity servo (in contrast to a position servo) is employed to reach the vicinity of a target track.

Next, the control system must position the scanner on the track center line (TCL) of a target track using the Y-direction servo with minimum settle-out time using a position controller of the type shown in equation (1), with $k_I$ normally set to 0.

Finally, the Y-servo system enters the track-follow mode with the Y-servo having a proportional-integral-derivative type (PID) position controller and the X-servo entering a scan mode desiring a fixed, predetermined scan velocity (by either using a position servo or a velocity servo). This operation is referred to as "track-follow-scan mode" to emphasize that the Y-servo is maintaining the storage media along a TCL as the X-servo persistently maintains a predetermined scan velocity. Both servos preferably maintain precision against disturbances, such as unknown hysteresis effects and vibration.

Scan Mode

FIG. 4 illustrates two reference trajectories to generate X and Y motion under "track-follow-scan" and "turn-around modes", where an exemplary X-scan length of 100 μm is to be achieved in 100 ms (1000 μm/s), and the Y position is stepped by 40 nm at the end of a track. The scan rate can be programmed by choosing an appropriate slope for the ramp trajectory for the X-servo.

Figure 5:
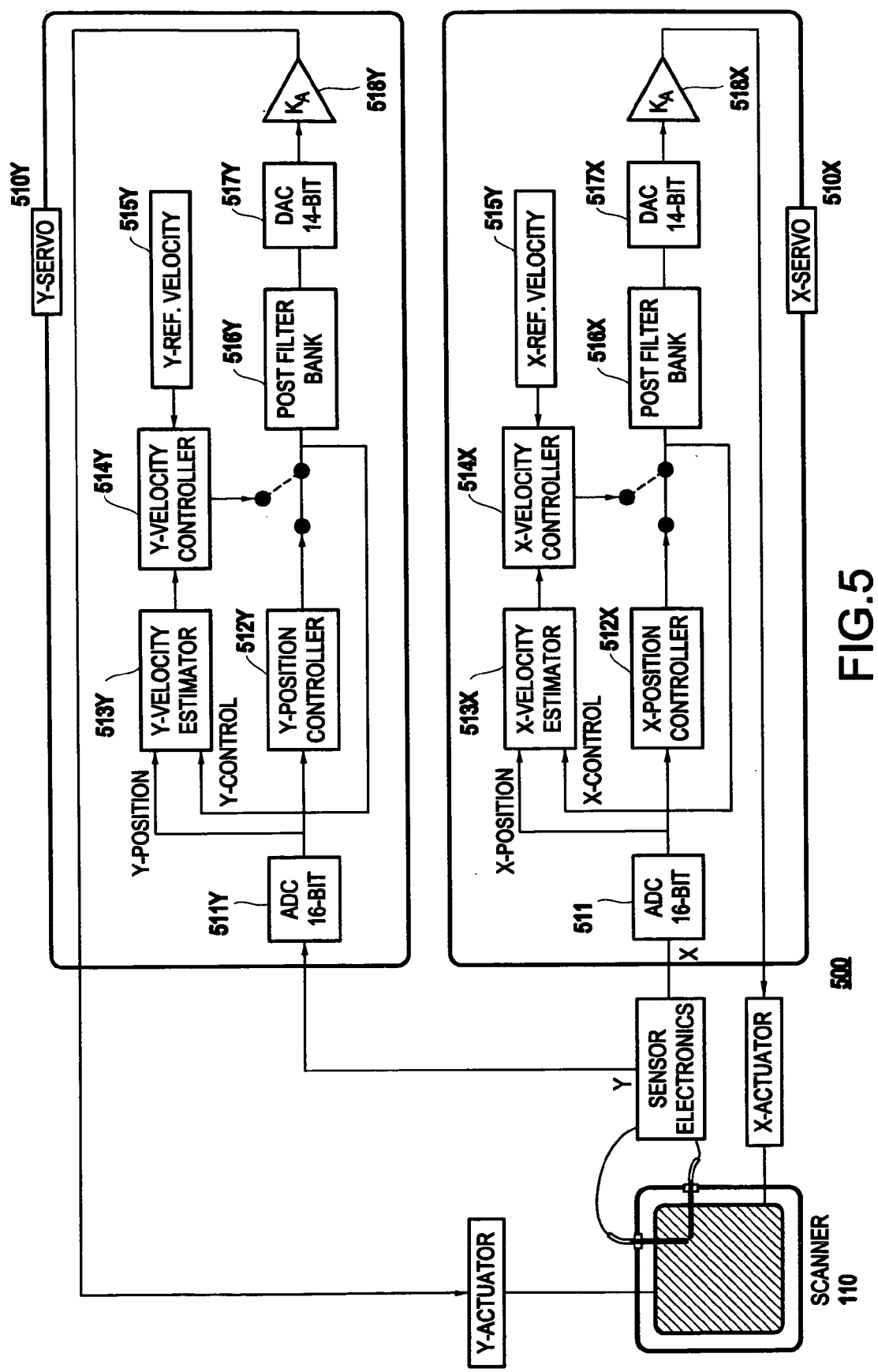
FIG. 5 illustrates an architecture of a servo controller 500.

A complete servo architecture 500 to achieve this operation, as well as the X-Y seek, is shown in FIG. 5. Architecture 500 includes X-servo 510x and a Y-servo 510y.

It is noted that, for completely decoupled dynamics of a scanner along the X and Y coordinates, the servo system 500 can be selected to have identical building blocks, but different controllers (position vs. velocity) may be switched in and out of the servo loop at various phases of the scanner motion.

The position information is generated by the optical edge sensors (unreferenced in FIG. 5 and similar to those shown in FIGS. 2A–2C) and converted to a stream of digital numbers (at 5 kHz in this example) by an analog-to-digital converter (ADC) 511a, 511y.

A digital controller for each axis includes a position controller block 512x, 512y, velocity estimator block 513x, 513y, velocity controller block 514x, 514y, reference trajectory block 515x, 515y, and a post filter bank 516x, 516y.

Under the supervision of a microprocessor, the functions provided by the blocks are activated appropriately. The computed control output in digital form is sent to a digital-to-analog convertor (DAC) 517x, 517y at a rate equal to, or different from, the input sampling rate. The analog signal generated by the DAC drives a current amplifier 518x, 518y, which in turn respectively energizes the actuator 150, 155 of the scanner.

Scanner parameters, such as equivalent mass, spring stiffness, actuator force constants, etc., can be different for each X and Y motion, and some parameters can drift with time and temperature. The block diagram of FIG. 5 can be further enhanced to include calibration functions and other critical or auxiliary operations which are not the subject of the present invention, but may be needed to make the servo control effective under different operating conditions.

Figure 6C:
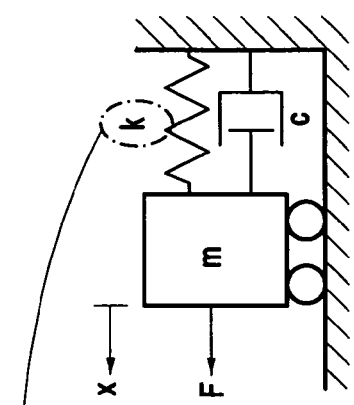
FIGS. 6A–6C illustrate a transfer function of the scanner along one axis including Magnitude (FIG. 6A), Phase (FIG. 6B) and a mass-spring-damper model (FIG. 6C)
Figure 6A:
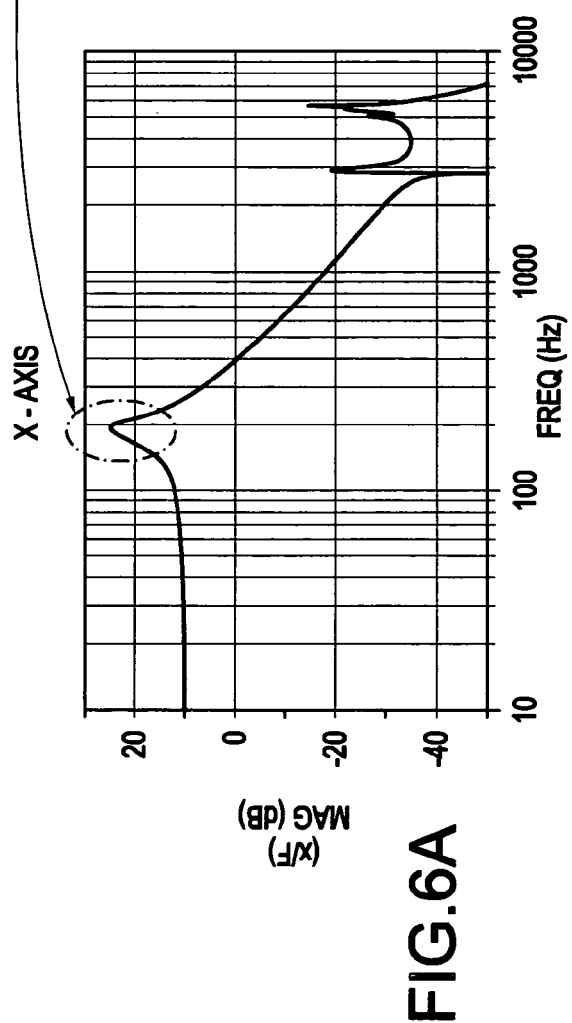
Figure 6B:
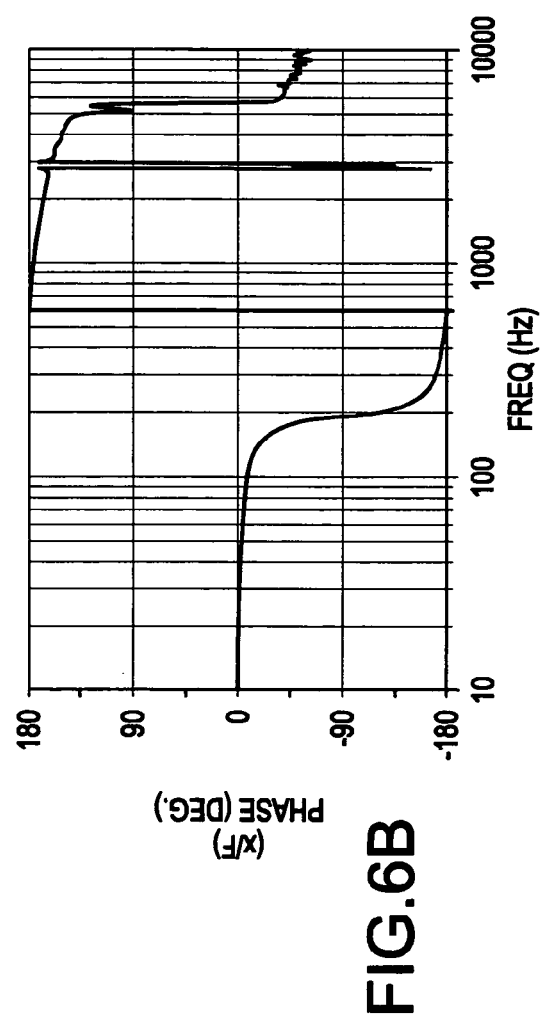

FIGS. 6A–6B show the measured transfer function magnitude and phase of the scanner system corresponding to X-directional excitation, while the Y-direction actuator is held inactive (i.e., no Y-drive current).

A second order equivalent model is shown in FIG. 6C, in which the displacement x corresponding to an input force F is resisted by a simple spring-mass-damper-like system below a frequency range of 2.5 kHz. The equivalent spring stiffness k and mass m determine the fundamental resonance frequency (200 Hz in this case). The damping constant c determines the quality factor Q of the fundamental resonance mode. The explicit presence of the stiffness term "k" is a key challenge in extracting optimum performance from a commercial product and is a subject of this invention. Beyond 2.5 kHz higher frequency resonance modes start to contribute to motion along the X axis. In the exemplary scanner, 3.0 kHz and 5.5 kHz modes are observable. Similar frequency characteristics along the Y-axis were observed in this scanner design by the present inventors.

Thus, the simple schematic of FIG. 6C shows that the system will behave very well as a simple spring mass system up to about 2.5 KHz.

To enhance nanoscale mechanics, the post filter bank 516x, 516y (shown in FIG. 5) can be configured to function as a notch or low-pass filter with relevant high frequency modes.

Thus, again FIGS. 6A–6C shows that the system of the invention can be viewed as a simple spring-mass system.

FIGS. 7A–7B show an open loop transfer function (OLTF) corresponding to a digital equivalent of a PID controller. The track-follow servo for the Y-axis would use a PID digital controller with very similar properties to those shown in FIGS. 7A–7B. The computed and measured OLTF agree well since the MEMS system has a friction-free motion capability (with mild hysteresis as discussed later).

However, the freedom from friction-induced performance degradation is now replaced by an explicit "stiffness" term in the plant (i.e., scanner system) dynamics. As the MEMS-based scanner should achieve precise scan and optimum seek capability, it is important to evaluate its performance characteristics in the presence of a strong stiffness term.

Thus, using a reasonably well-known controller (e.g., PID-like controller), the flexure-based structure can be measured and modeled to fit to these curves. Thus, FIGS. 7A–7C show servo compensation being employed in addition to the basic spring mass system characteristics shown in FIGS. 6A–6C.

Figure 8:
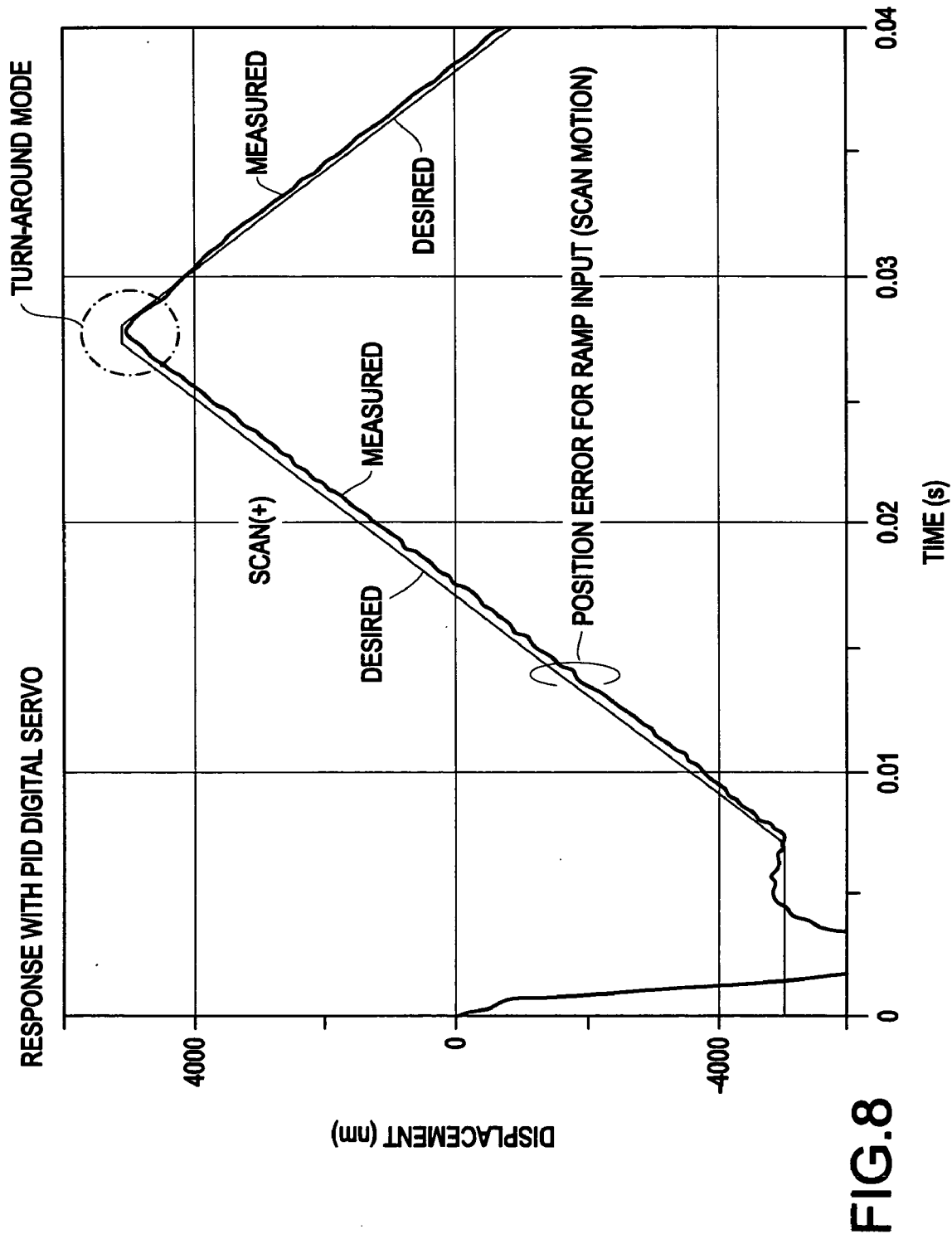
FIG. 8 illustrates a ramp reference (desired) trajectory for a scan mode and an actual (measured) trajectory.

If one wishes to perform a scan using the position controller, then FIG. 8 shows a comparison between a desired scan trajectory and a measured scan trajectory under PID position control. Such a ramp (positive scan) in FIG. 8 is somewhat similar to what is shown in FIG. 4, but is implemented using a position controller. The scan rate of (R=) 500 μm/s produces a steady position error of 250 nm. Since the actual position is known through direct measurement and the actual velocity is still equal to the desired value, the position error with respect to the reference ramp may not be detrimental under certain Read/Write conditions.

However, when the scanner trajectory is to be flexibly programmed using an arbitrary reference trajectory, position error becomes an impediment, and it distorts the actual trajectory from the desired one. The position error "e" under a ramp trajectory represented by x=Rt, where "t" is the time, can be shown as:

$$e = R \, k_{Stiffness}/k_I \quad (2)$$

For a stiffness-free system, for example the case of a bearing-supported mass, the stiffness contribution is minimum, and the error term "e" is near zero.

For a MEMS with significant stiffness, equation (2) demonstrates that the error grows linearly with stiffness. Especially in cases where the scan rate "R" is increased for certain error recovery or retry operations during a R/W, the position error "e" can grow as well. The error term can nevertheless be reduced by increasing the integral gain term "$k_I$", but this method has limitations arising from control and stability considerations. Thus, an alternative method to minimize the error "e" is desirable.

In characterizing structural properties of a control system, the OLTFs are classified as type-0, type-1, type-2 . . . systems (e.g., see S. Gupta and L. Hasdorff, *Fundamentals of Automatic Control*, John Wiley & Sons, Inc., p. 86, 1970.), where the type order is determined by the power of the free standing denominator variable "s" of the OLTF. Thus, the term $s^1$ would indicate a Type-1 system.

Figures 9A, 9B, 9C:
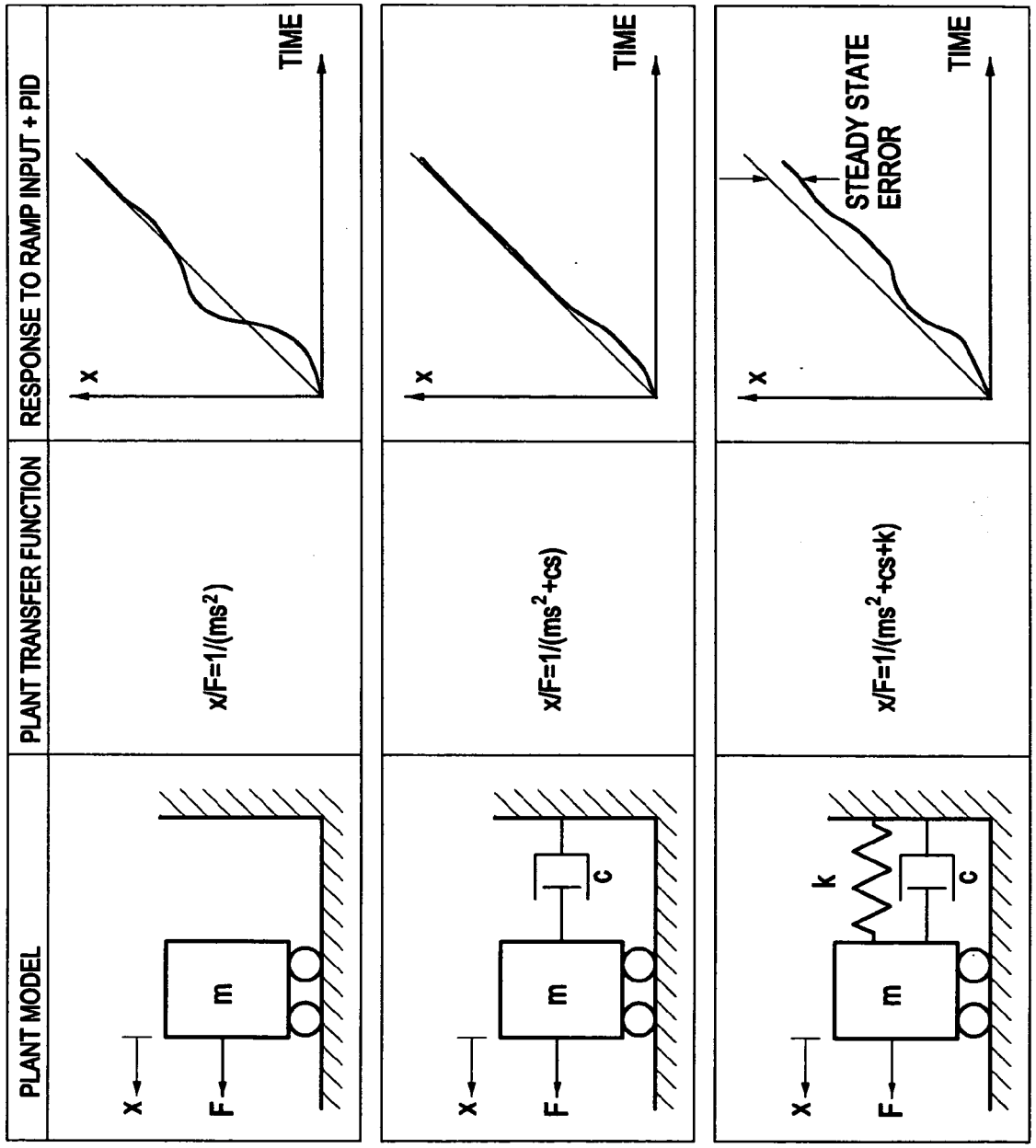
FIGS. 9A–9C respectively illustrate an effect of plant parameters on position error for a ramp reference input.

FIGS. 9A–9C summarize three cases of a mass (m)-spring (k)-damper (c) system.

In the case of FIG. 9A, the plant is free to move along the x direction under an excitation force F with no resistance. The plant transfer function (TF) (e.g., LaPlace transform) thus has a "$s^2$" term in its denominator. Under a PD or a PID feedback control, the control system becomes a type-2 or type-3 respectively. (Note that an integrator in a PID control introduces an extra term "s", whereas a PD control will not.) The steady state error due to ramp reference input for a system of type-2 or higher can be proved to be null, as schematically shown for cases in FIGS. 9A–9C.

In the case of FIG. 9B, if there is only damping and no stiffness, for example the mass is immersed in a viscous liquid, then the new plant "s(m s+c)" has a single power for the free standing "s". Under PD or PID control, the OLTF becomes either type-1 or type-2. It can be shown that, for a ramp input with a PD controller, there will be a steady-state position error, but with PID the error is null.

In the case of FIG. 9C which is more realistic and is the case for a MEMS device, the OLTF with PD or PID will be either type-0 or type-1. It will be illustrative to set up the OLTF for the PD and PID cases as follows:

$$\text{with a PD controller OLTF} = (k_P + k_D s)/(ms^2 + cs + k) \quad (3)$$

$$\text{with PID controller OLTF} = (k_P + k_D s + k_I/s)/(ms^2 + cs + k)$$
$$= (k_D s^2 + k_P s + k_I)/[s(ms^2 + cs + k)] \quad (4)$$

It is observed that the power of the free standing "s" variable in the denominator of the OLTF is either 0 or 1, respectively. It can be shown that the corresponding error is either infinity or finite (equation 2). Experimental evidence, shown in FIG. 8, confirms that the steady state position error is finite for a ramp reference input with a PID controller. With a simpler PD controller the error is unbounded and grows with the amplitude of the ramp input.

The basic mechanism creating an error "e" is that, as ramp reference displacement increases, the actual stiffness of the spring creates an increasing resistance to motion. Thus, a fixed gain term in a PD controller (equation (3)) can only produce a proportionally increasing drive force by growing the position error term with time at best.

In the case of a PID controller, the integrator can produce a continuously increasing drive force by means of a bias error in the position represented by equation (2).

To minimize the error challenge, one approach is to introduce a double integral in the controller. However, this method has stability implications, since each integral introduces a 90-degree lag in the phase of the OLTF.

The present invention solves the stiffness-based resistance to motion by providing a counter balancing force through electronic means. If the actual or desired position of the scanner is known, then an electronically-generated force can be applied through the actuator to eliminate the resistance to motion.

When this form of counter balancing is augmented with a conventional PID controller, then the steady state position error for a ramp reference input is minimized, while preserving the merits of a feedback control system.

Thus, now that it is known from FIGS. 9A–9C how the mechanism works in producing the steady state position error, since the scanner system has a stiffness which is measurable, and it is known what is desired when a ramp motion is to be performed, such a burden need not be placed solely on the servo controller.

Figure 10:
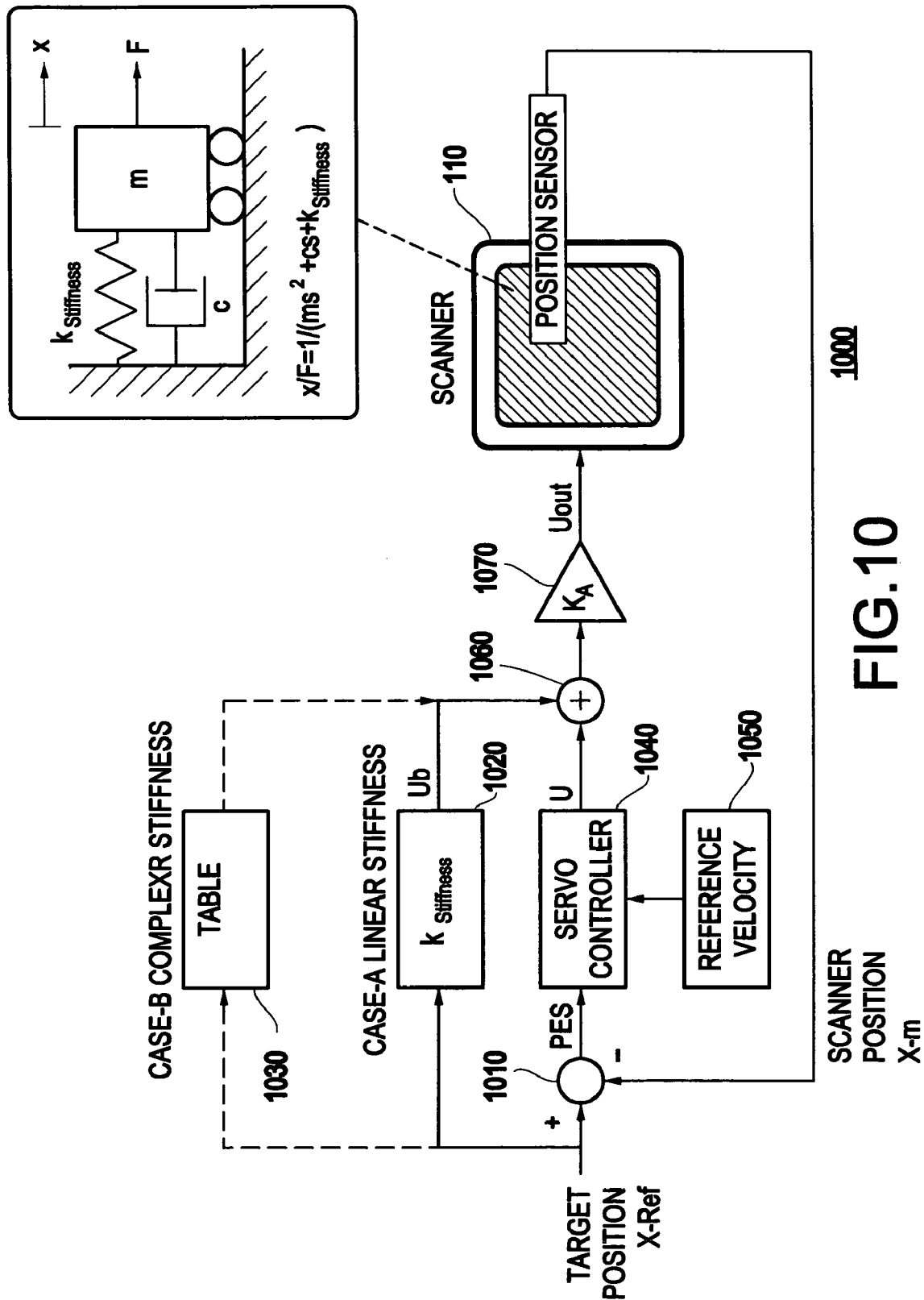
FIG. 10 illustrates a feed forward configuration structure 1000 to minimize the impact of MEMS-stiffness on position error.

Instead, FIG. 10 shows an exemplary structure 1000 of a feed forward configuration in which the anticipated stiffness term is canceled by a feed forward element (e.g., through a stiffness term including either a $k_{stiffness}$ unit 1020 for linear stiffness, or a look up table 1030 for complex stiffness).

Thus, in this exemplary embodiment the target term (e.g., the target reference) can be fed through the stiffness term digitally to the actuator as a current. Indeed, since it is known at each moment a desired position, if the corresponding spring force can be neutralized, then there is typically no restoring force which needs to be applied by the controller itself. Thus, the exemplary approach of the present invention is to feed forward the stiffness term without waiting for the controller to build up.

That is, in the structure 1000 of FIG. 10, an input target position X-reference value (term) is provided to a node (e.g., a summing node) 1010, a $k_{stiffness}$ unit 1020 (for linear stiffness; case A in which k will be a constant term) and a table 1030 (for complex stiffness; case B in which k is a term having a complex, parabolic etc. type waveform). The node 1010 also receives a scanner position signal X-m from the scanner (having a position sensor) 110. The node 1010 takes the difference between the target position X-reference and the measured scanner position.

Based on the difference, the node unit 1010 outputs a position error signal (PES) to a servo controller 1040, which is also provided with a reference velocity input 1050. An output U of the servo controller is provided to a digital summing node 1060. The digital summing node 1060 also receives inputs $U_b$ from $k_{stiffness}$ unit 1020 and table 1030, depending upon the linear stiffness or complex stiffness being present.

The node 1060 provides an output to an amplifier $K_A$, which in turn amplifies (integrates) the signal from node 1060 and provides a signal $U_{out}$ to the scanner. The scanner 110 in turn provides the scanner position X-m signal to the node 1010.

Thus, there are two possible approaches to generating the counter balancing term.

In Case-A, the stiffness is known to be a linear or mathematically representable function. In this case, a compact computational representation from $k_{stiffness}$ unit 1020 would be sufficient to compute the required actuator current.

In Case-B, the resistance force is a complex function of position. In this case, the look-up table 1030 is constructed employing a calibration method in which the quasi-static current (mA) vs. displacement (μm) data is measured and stored therein.

Figure 11:
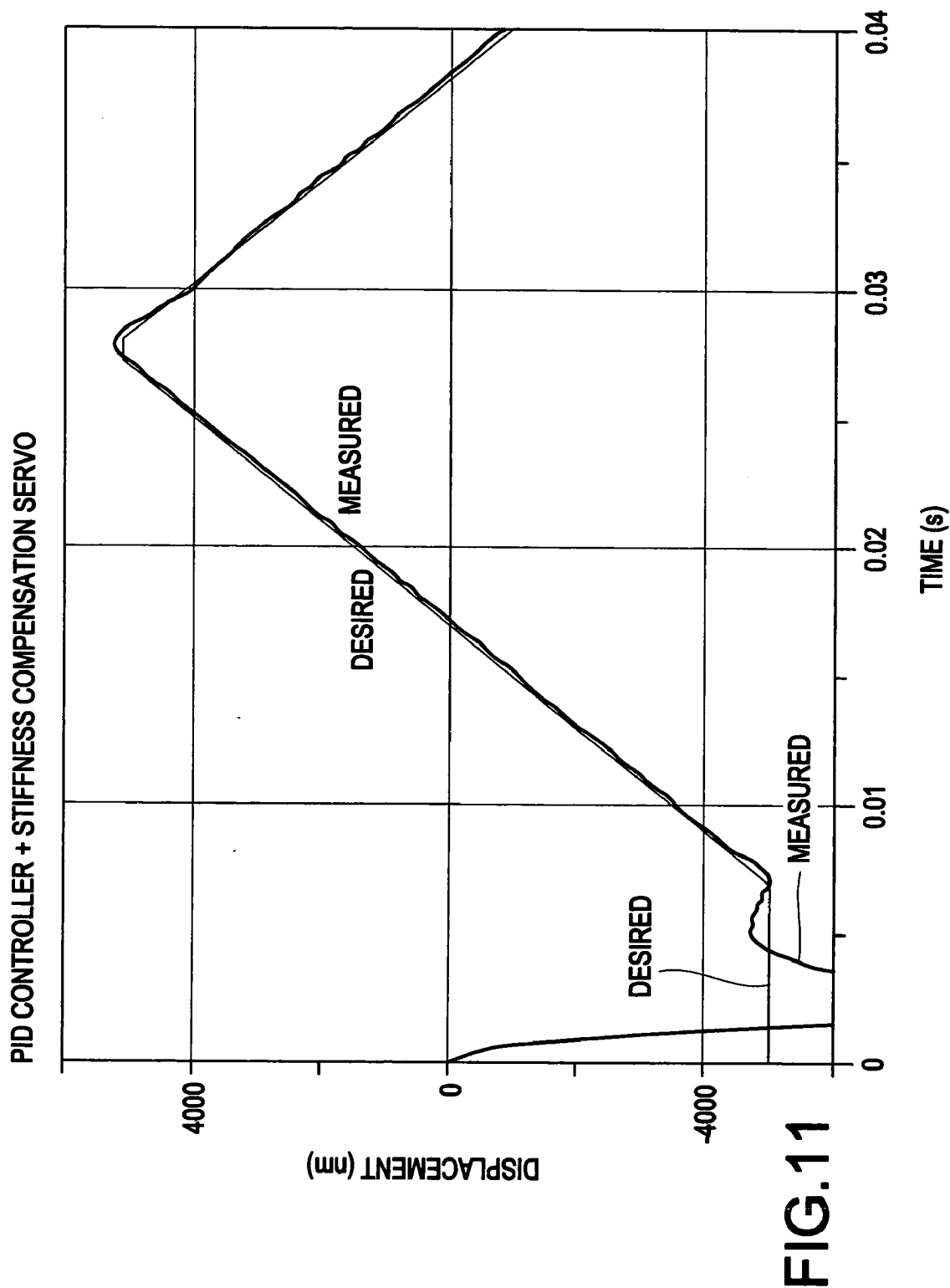
FIG. 11 illustrates a ramp reference trajectory and an actual response with stiffness compensation servo.

When FIG. 10 is implemented, the results shown in FIG. 11 are obtained.

That is, FIG. 11 shows the positive effect of using the stiffness counterbalancing feed forward method during a ramp motion. Compared to the case corresponding to FIG. 8, the position error component is almost unobservable. A linear approximation to the stiffness is used to compute the counterbalance force. The stiffness term is derived by performing a quasi-static calibration.

Figure 12:
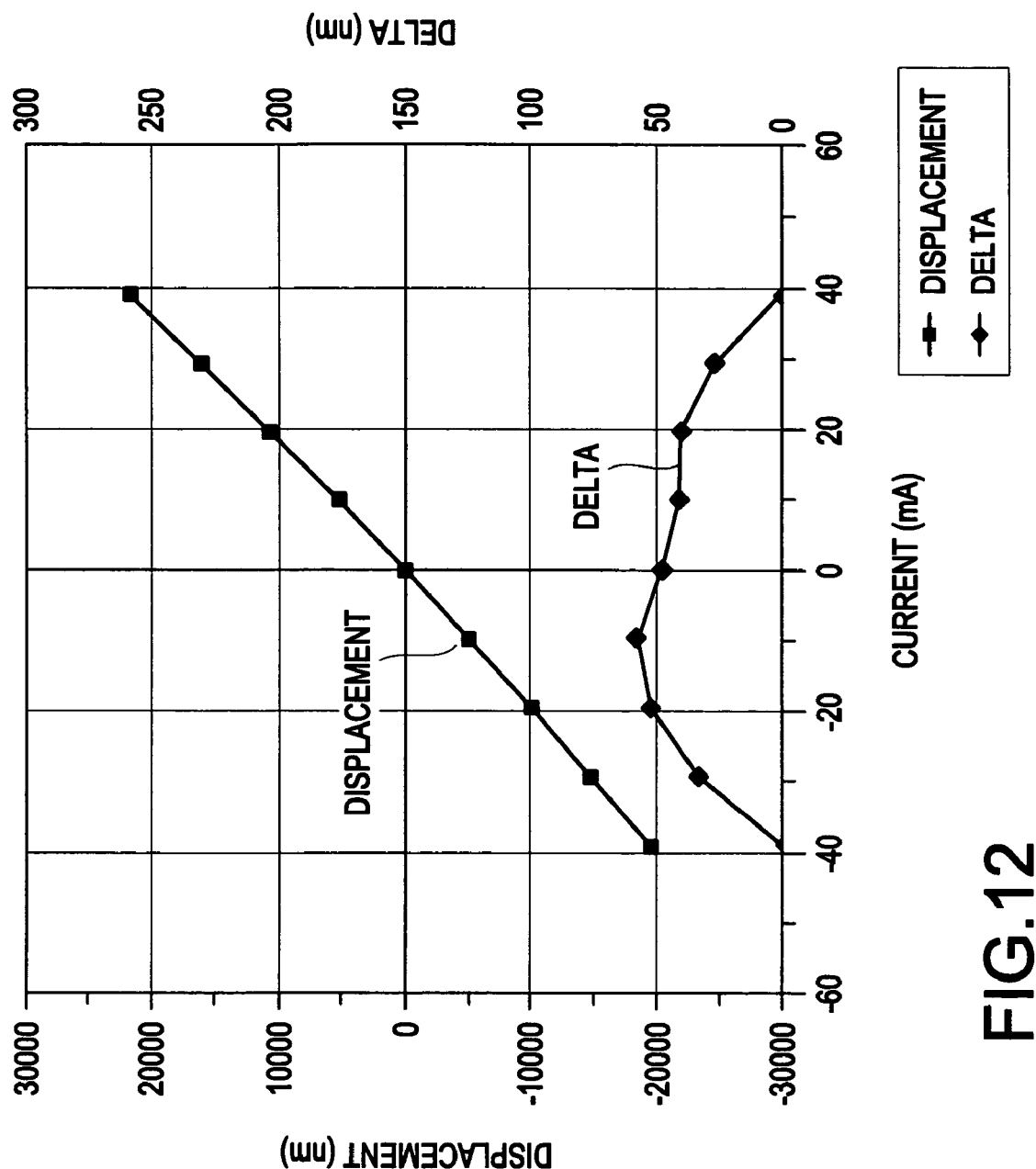
FIG. 12 illustrates a scanner displacement vs. current.

By injecting a steady current in steps of 5 mA from the neutral position (Location-A) of the scanner and observing the corresponding equilibrium position of the scanner, the necessary stiffness term is derived. The result of the calibration is shown in FIG. 12.

On the scale of 20 μm displacement, the displacement plot appears very linear. However, the forward/return motion due to increasing/decreasing current is not identical. The difference between the forward position and the return position for the same current is plotted as the "delta," with its scale on the right side of the plot of FIG. 12. A difference of about 50 nm can be expected. Likewise, a finer scale calibration near the origin may yield a stiffness that is different from the average stiffness. Further analysis is needed to choose a method to accurately represent the stiffness term. It is noted that any non-linearity in the actuator force generation capability is implicitly included in the composite representation by the plot in FIG. 12.

Thus, the inventors found that, by going from a forward direction and then going in the backward direction by increasing the current to 40 mA and then decreasing the current from 40 mA, because silicon substrates have some inherent relaxation in stiffness, then the corresponding position may not be exactly the same when the current goes back to the original 30 mA, for example. However, the difference will not be substantial and will not be outrageously inaccurate. By the same token, it will be useful to use a feedback controller to manage the variations, but the gross stiffness element is addressed by the system's feedforward scheme of the present invention.

Figure 13A:
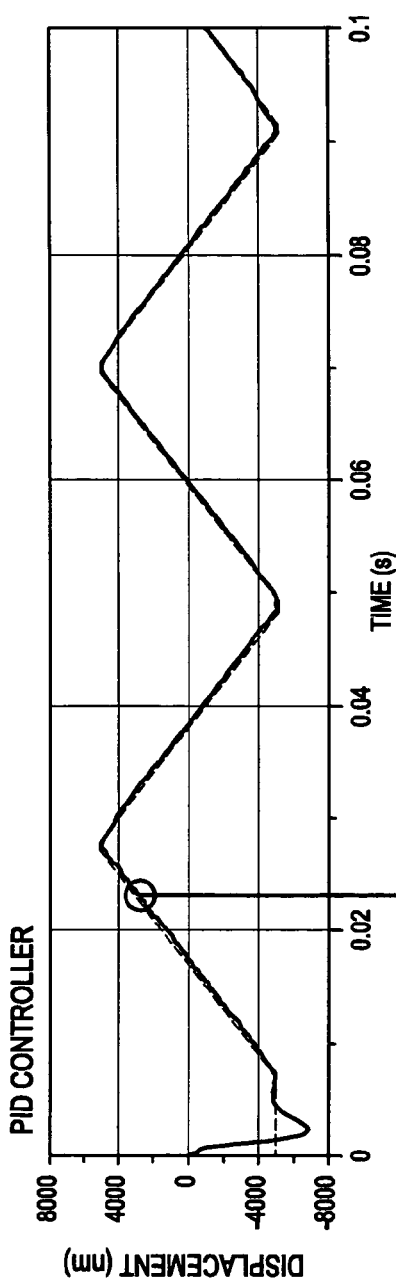
FIGS. 13A–13C illustrate two cases, with and without stiffness compensation servo, with position error shown in detail.
Figure 13B:
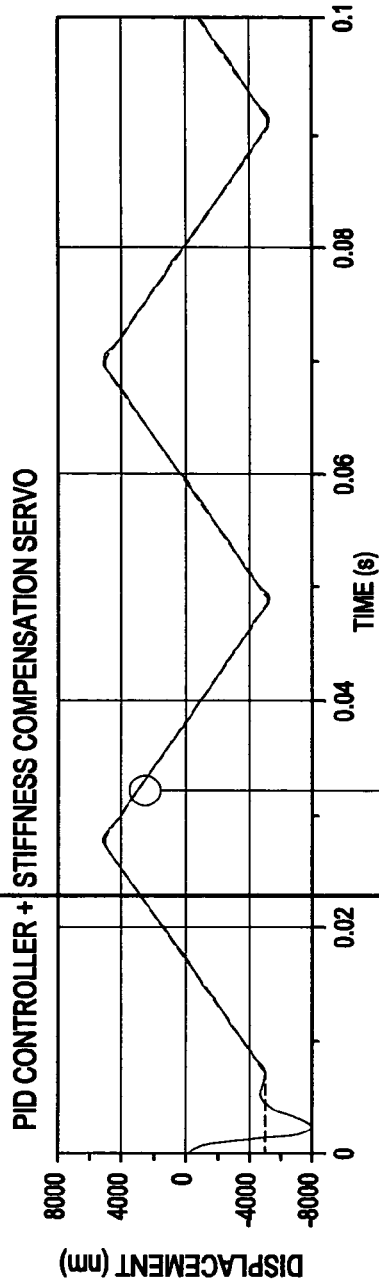
Figure 13C:
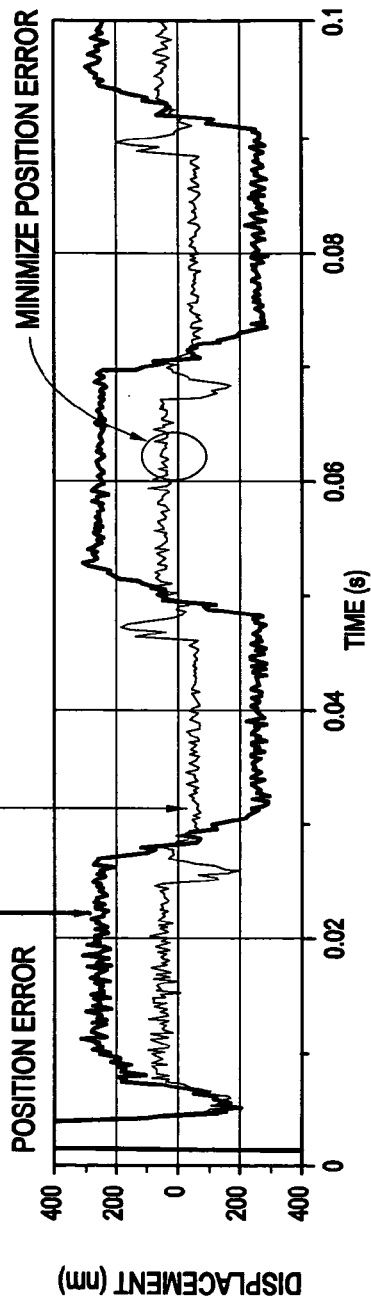

The detailed position error characteristics, including the reference and actual trajectories for both cases (corresponding to FIGS. 8 and 11), are shown in FIGS. 13A–13C. The position error has been reduced from 250 nm to 50 nm for a nominal stiffness value. The position error component can be easily driven to near zero by updating the stiffness term as frequently as necessary.

Figure 14:
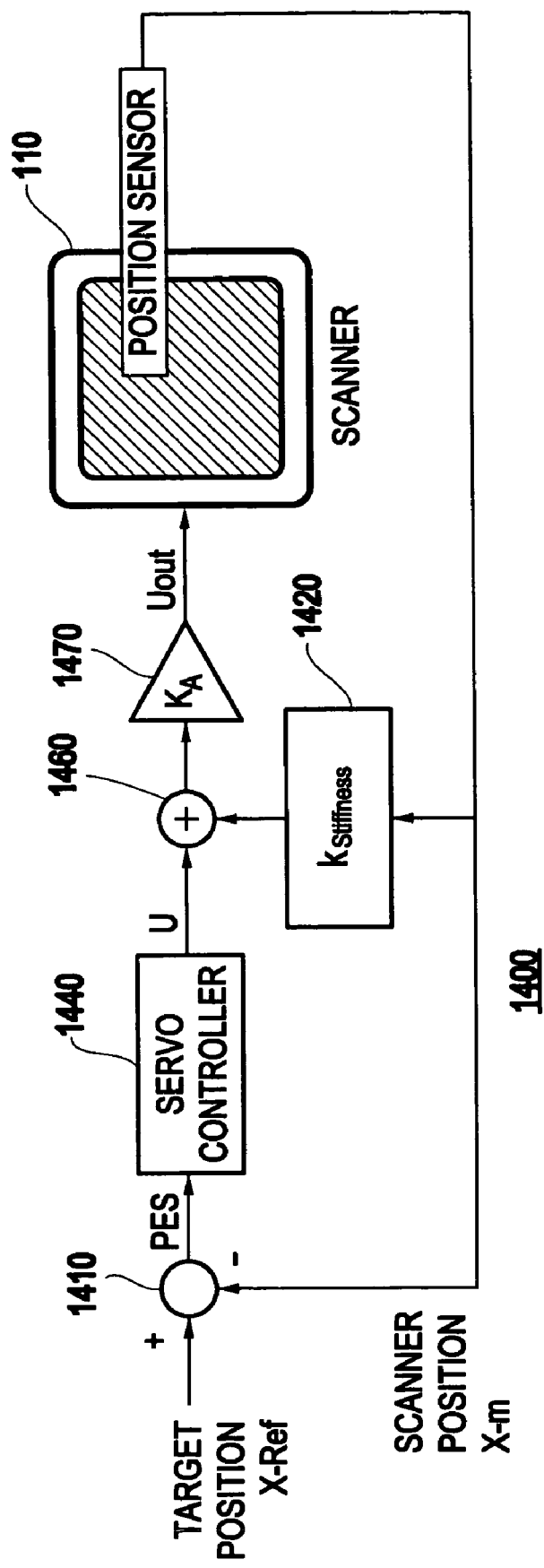
FIG. 14 illustrates an alternative configuration to reduce the impact of stiffness (i.e., feedback mode)

The stiffness counterbalancing effect can also be achieved in a feedback mode in which the measured position is positively fed back, as shown in FIG. 14. Thus, FIG. 14 shows another way to achieve the same result as the system of FIG. 10. However, in the case of the system of FIG. 14, the stiffness term of the scanner 110 is made to appear as 0 (null) to the controller.

Hence, since a position sensor is disposed for providing an absolute position (or a position with regard to a neutral position), such a stiffness term (which is positive) can be fed through a stiffness element 1420 (in a digital processor or the like) to a digital summing node 1460 to counterbalance. Thus, in this exemplary embodiment, the scanner 110 plus the stiffness term (which is a positive equivalent feedback force) will counterbalance the negative value of the scanner output, thereby resulting in a free (floating) system.

In this method, while making the plant appear like a system without stiffness, the PID controller must be redesigned to account for the modified plant characteristics. As noted above, the feedback method requires reliable position measurement through out its operation. An overestimate of the stiffness can also result in an unstable plant when the conventional control is not activated as it is in a positive feedback configuration.

Furthermore, any noise in the position measurement could translate into a spurious disturbance component, thus generating an undesirable positioning error. The feed-forward method, using the reference position signal, is thus preferable to the feedback method.

Velocity Estimator

Scan mode and seek mode operations require knowledge of the scanner velocity along each axis. Under a velocity servo mode, an estimate of the velocity is repeatedly used to generate the control values. The position control servo exploits the velocity estimates to ensure, for example, that the desired switching conditions from a velocity to a settle-out position servo are met at the end of a Y-seek. It is noted that the cost of embedding a velocity sensor, in addition to a position sensor, can be excessive and may usurp the electronic circuit resources. Since the scanner position is sampled at discrete time instants separated by a fixed duration (i.e., sampling period), a simple estimate of scanner velocity is the arithmetic difference between adjacent position values. However, in practice the position-difference method becomes corrupted by the measurement noise, and newly developed statistical estimation methods could be considered (e.g., see R. F. Stengel, *Stochastic Optimal Control*, John Wiley & Sons, Inc., Chapter 4, 1986).

A state variable-based full state estimator (including the velocity) is employed to obtain the estimates of the scanner along the X and Y axes. The following variables are first defined:

n=Sampling instant;

U(n)=Actuator Current Driver input expressed in DAC Bits;

Y(n)=Actuator Position Sensor output expressed in ADC Bits;

V(n)=Actuator Velocity in ADC Bits/Sample;

X1(n)=Estimated Position in ADC Bits;

X2(n)=Estimated Velocity (=V(n)); and

X3(n)=Estimated Unknown force in DAC Bits.

By casting the scanner dynamics as a second order system with two state components X1 and X2, and by augmenting the second order model with an additional state X3 representing the unmodeled portion of the force (e.g., see M. Sri-Jayantha and R. Stengel, "Determination of nonlinear aerodynamic coefficient using the Estimation-Before-Modeling Method," *Journal of Aircraft*, Vol. 25, no. 9, pp. 796–804, September 1988) acting on the scanner, a state estimator of the following form can be formulated:

$$X1(n)=A1*X1(n-1)+A2*X2(n-1)+A3*X3(n-1)+B1*U(n-1)+G1*Y(n)$$

$$X2(n)=A4*X1(n-1)+A5*X2(n-1)+A6*X3(n-1)+B2*U(n-1)+G2*Y(n) \quad (5)$$

$$X3(n)=A7*X1(n-1)+A8*X2(n-1)+A9*X3(n-1)+B3*U(n-1)+G3*Y(n)$$

where constants [A1 through A9], [B1 B2 B3] and [G1 G2 G3] are determined by the parameters of the scanner transfer function (TF) and the desired filtering characteristics of the estimator. The filtering property is broadly governed by the characteristic roots of the dynamic system represented by equation (5) above.

Figure 15A:
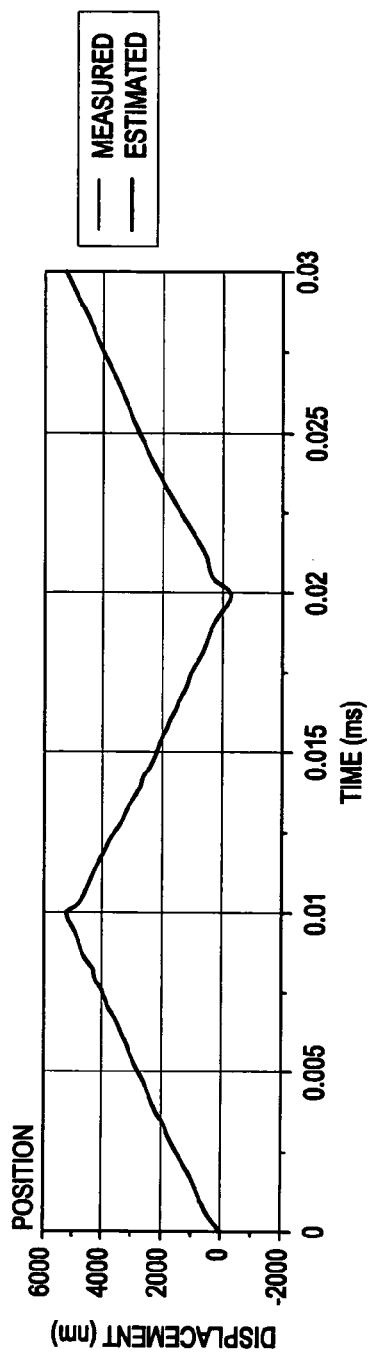
FIGS. 15A–15C illustrate performance of a digital velocity estimator in scan mode.
Figure 15B:
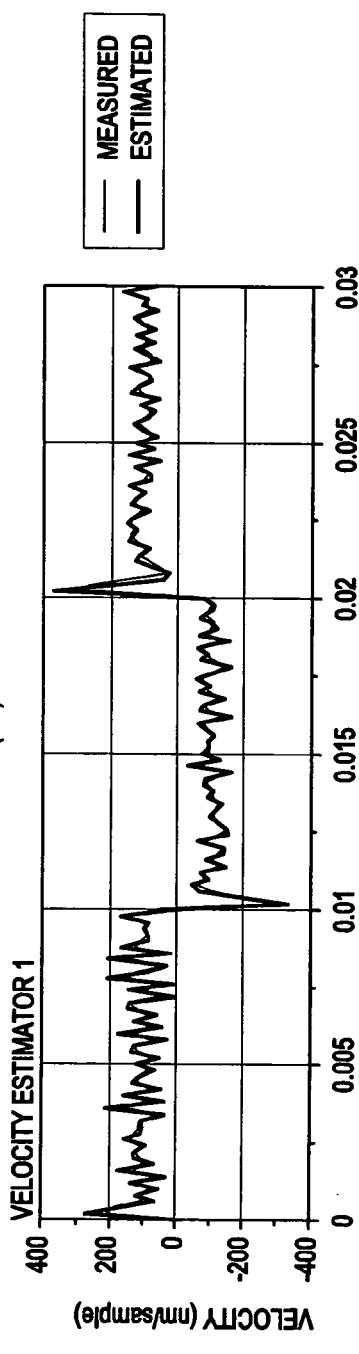
Figure 15C:
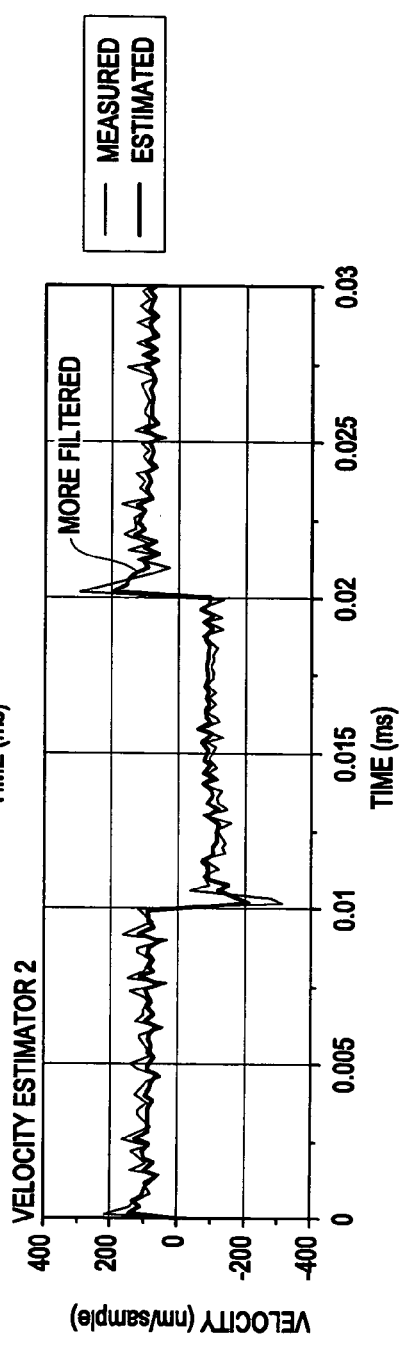

FIGS. 15A–15C show the effect of the estimator characteristics under a scan mode (e.g., from location B to location C in FIG. 3C). These Figures show that a very sophisticated velocity estimator as an exemplary part of the entire implementation of the invention.

FIG. 15A corresponds to a ramp rate of 5000 nm/10 ms, which is also equal to a scan rate of 100 nm/sample at a 5 kHz sampling rate. Thus, FIG. 15A shows the measured and estimated position.

FIG. 15B shows a position difference and an estimated velocity, employing matrix equation (5) with the characteristic root at a 1500 Hz radius. FIG. 15B shows the digital estimator to be very "fast", meaning that it does not filter very much. As shown, there are many sharp peaks ("wiggles") in the waveform during the steady velocity, whereas if there is a redesign of the filter to slow down or to add more filtering characteristics (e.g., to filter better) to the estimator, then the results will be as shown in FIG. 15C in which the velocity is made "smoother", and thus much better than that of FIG. 15B.

That is, FIG. 15C shows the same position difference plot compared to a redesigned velocity estimator (e.g., Velocity Estimator 2) having a 1000 Hz characteristic root. It can be observed that the estimator has the capability to filter noise depending on the choice of its characteristic root as a design parameter. An estimator with a 1000 Hz characteristic root is used in the subsequent application to optimize X-seek.

Thus, the velocity estimator can be designed optimally to have better filtering characteristics.

Seek Mode

The seek mode performance is considered for optimization. In the scanner servo, both X and Y directional seeks are required. The Y-seek helps the scanner to move to a target track (e.g., Location-B in FIG. 3C) with zero terminal velocity since the subsequent motion for a R/W requires the scanner to maintain the tip-array along the TCL with zero mean velocity across the Y-axis.

However, the X-seek demands innovative consideration. It not only needs to optimize a seek criteria (such as minimum time or minimum overshoot into the margins of the storage media), it also has to produce a reverse velocity equal to the scan rate along X before a R/W can begin.

Progressively complex control methods can be devised to enhance X-axis seek control. First, three methods will be described below to enhance X-axis seek control, and then some experimental results will be shown.

The three methods include:

Method-1). A long step input to Location-B from Location-A is first made using a PID-like position servo. Once the destination is reached and a terminal velocity of zero is attained, the PID-like position controller driven by a ramp-reference trajectory with feed forward stiffness compensation is used. Extra space along the X-axis is needed to accommodate step input overshoot, as well as a "take-off runway" to accelerate the scanner from rest position to the desired scan speed;

Method-2). A cascade of short steps are generated until Location-B is reached, and the scan phase is initiated, as in the above case. In this case, the step input overshoot is decreased, but the seek time is likely to be increased; and Method-3). A velocity servo is used to follow a reference velocity trajectory all the way to Location-B where the direction of motion is changed under the same velocity servo and the scan mode is initiated using the same velocity servo. In this approach, the time to move from Location-A to a R/W ready condition is observed to be the least. Moderate overshoot space is still required in cases in which the velocity vector undergoes a 180-degree change of direction.

Figure 16A:
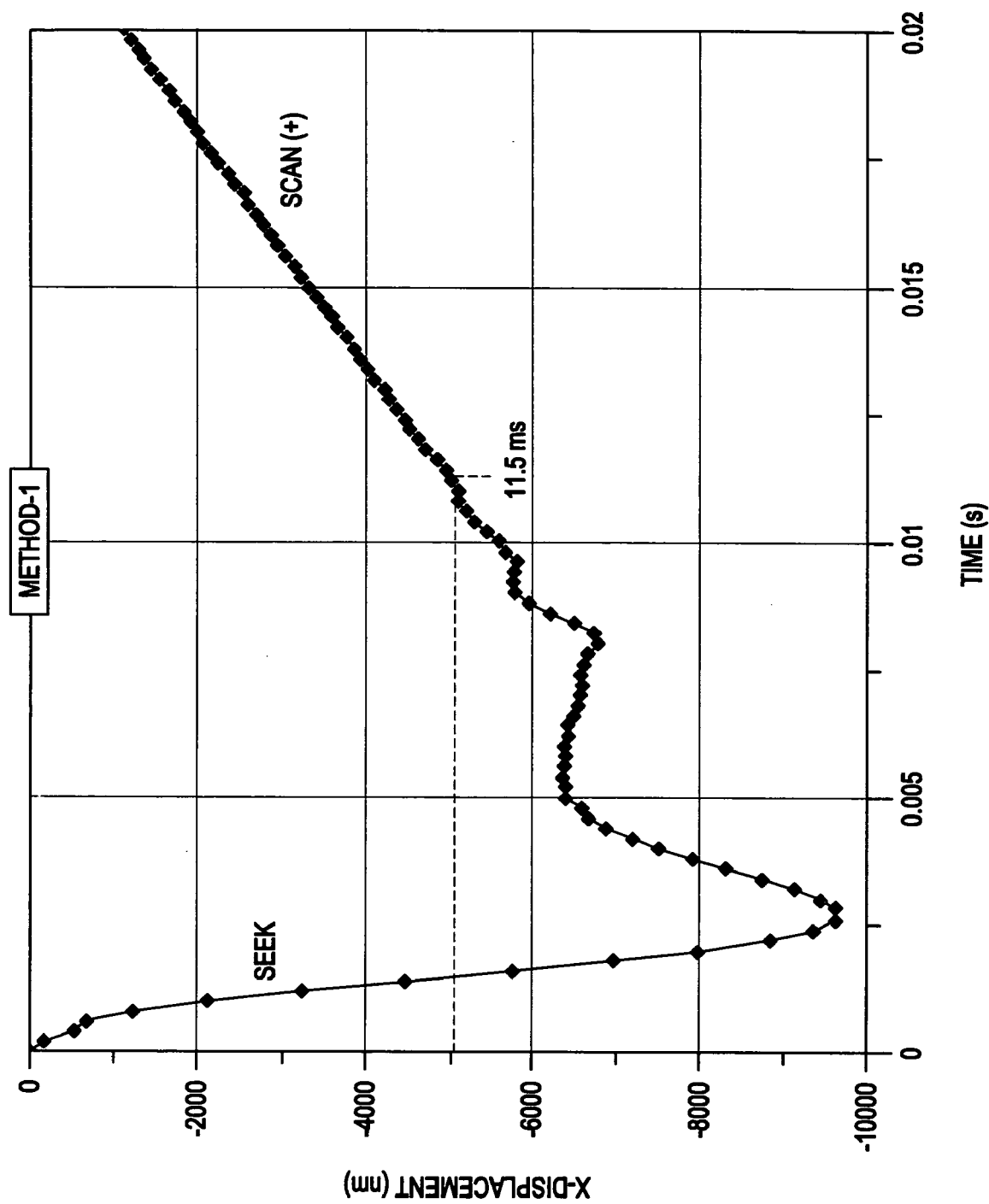
FIGS. 16A–16E illustrate a single step seek to location-B followed by a PID scan.
Figure 16B:
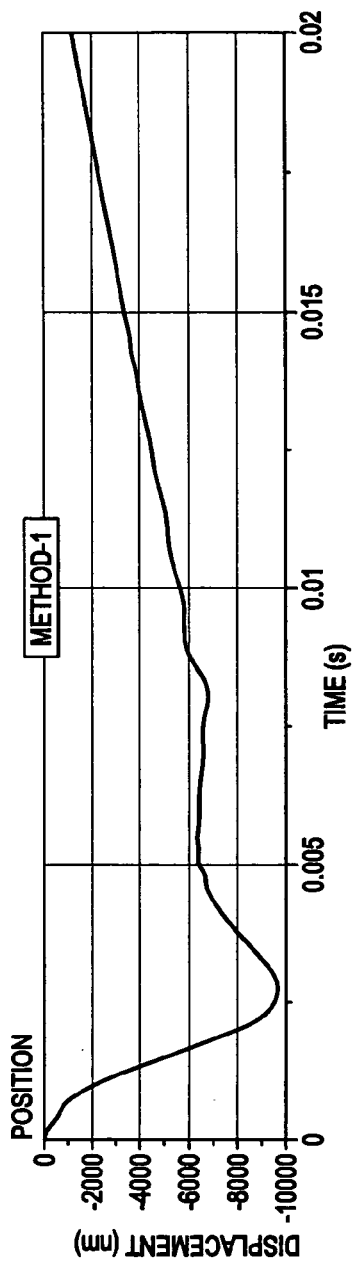

FIGS. 16A–16B correspond to Method-1. That is, a single step move to region B is made, to move there fast with some overshoot and then hesitate a while before following a ramp.

Method 1 does not take advantage of the $k_{stiffness}$, feedforward to the $k_{stiffness}$, knowledge of the system, etc., but does have feedforward during the scan. However, this feed forward is immaterial to this case since it is focussed on moving from location A to location B.

It can be seen that a 5 µm X-axis motion requires about 3 µm overshoot and 1 µm for the "take-off runway" needed for scan mode initialization. Before reaching the desired scan velocity, total time is about 11.5 ms.

Figure 16C:
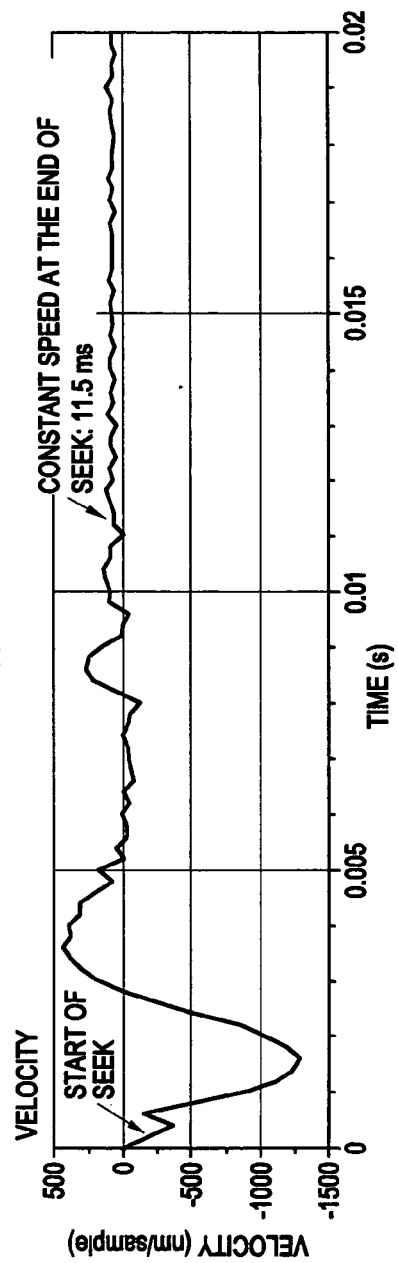
Figure 16D:
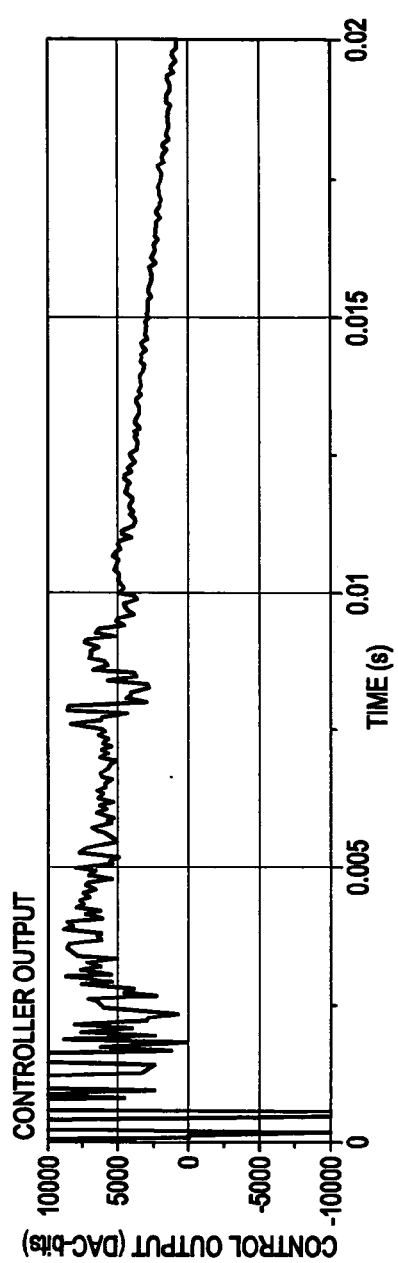

FIGS. 16B–16D correspond to position (repeat of FIG. 16A), velocity and current commands, respectively.

Figure 16E:
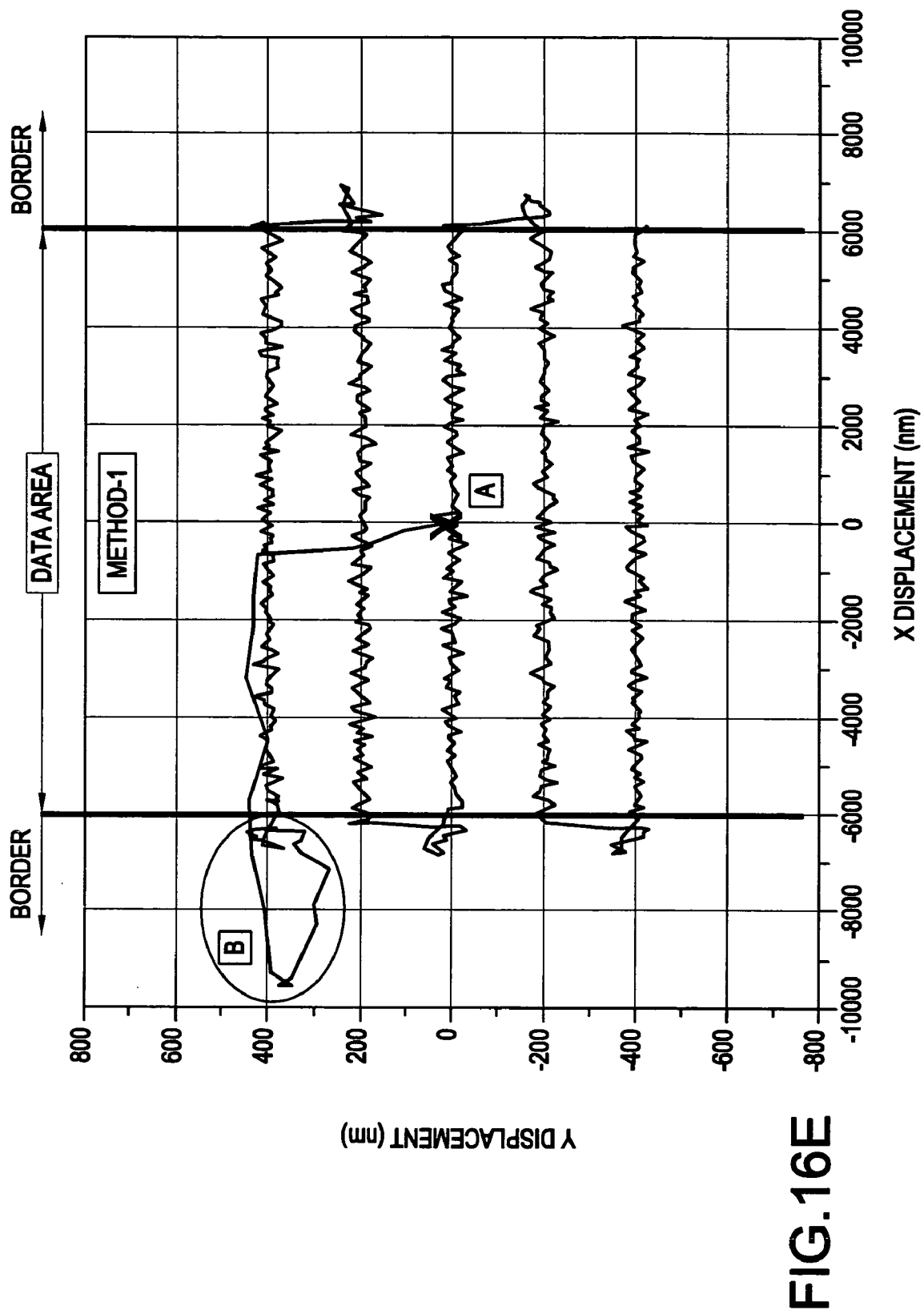

FIG. 16E shows a two-dimensional representation (e.g., movement in X and Y) with no time scale displayed on it. It is noted that the Y-scale is much finer (granular) than the X-scale. The seek operation begins from rest Location-A and moves to a target track near Location-B, followed by a Y-track follow servo and X-scan servo (e.g., referred to as a "track-follow-scan"). The "border" region covered by Location-B where the seek to track-follow-scan transition occurs is critical to the RIW performance, as well as an effective use of storage media. The scan tracks are separated by a 200 nm track pitch in this exemplary test.

Thus, FIG. 16E shows movement from original location A (e.g., the original rest position) to location B, overshoot at location B, turnaround, activate the scan and begin scanning to location C, step down, reverse scan across, step down, then perform a scan, etc.

FIGS. 17A–17E correspond to Method-2. This method recognizes that a single large step may be excessive. Thus, this method attempts to minimize overshoot, but at the expense of total time required which is much higher than that required in Method 1.

Hence, in Method-2, a cascade of mini-step moves reduces the overshoot to almost 0 μm with 1 μm still needed for the "take-off runway", but total time rises to 15 ms. More specifically, a plurality of approximately 0.5 to 1.0-micron size steps leading to the target position of approximately −5000 nm in FIG. 17A. However, in the exemplary embodiment, the steps may be permitted to move to −6000 nm to get ready for the scan and to minimize the transient delay.

Figure 17A:
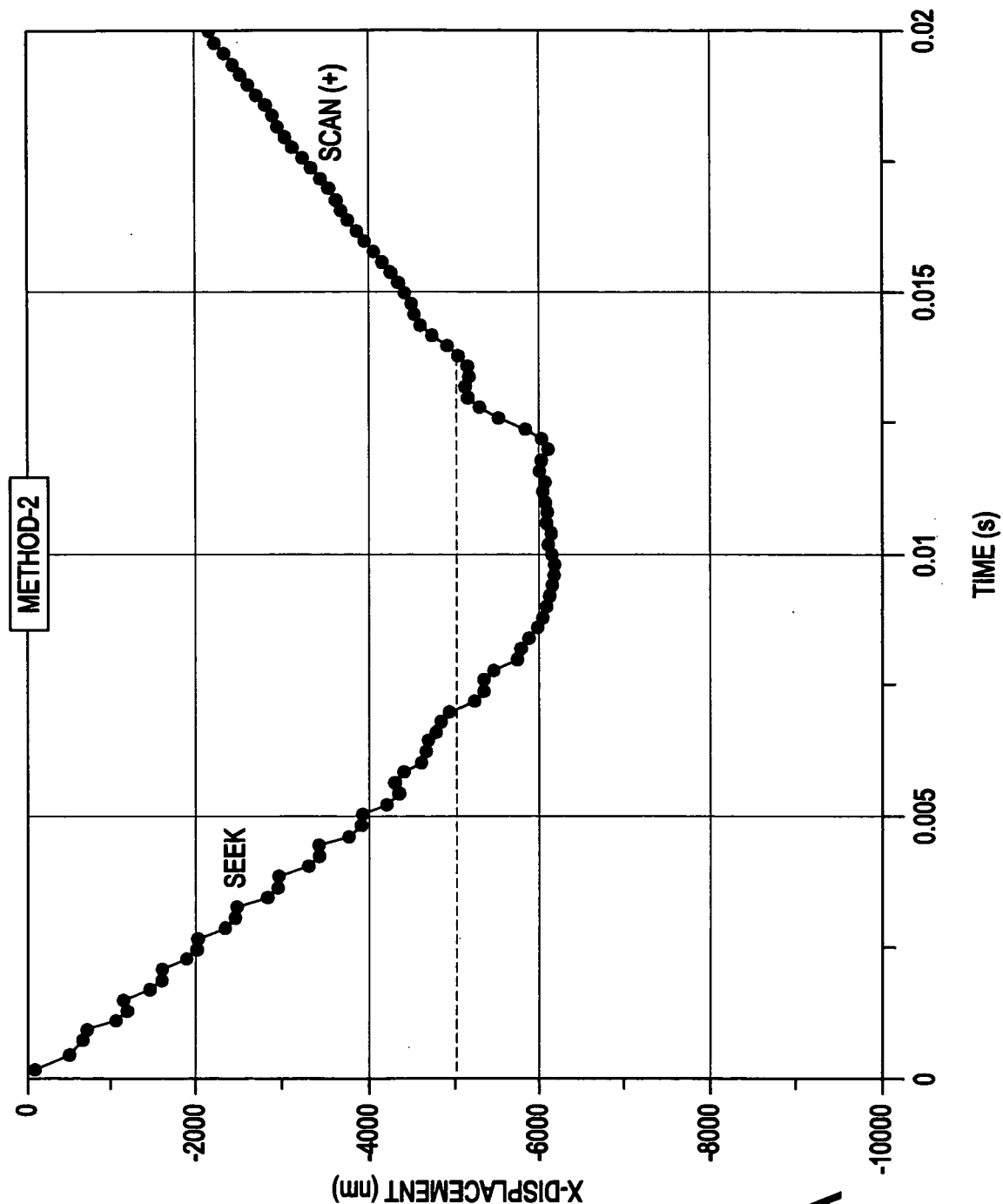
FIGS. 17A–17E illustrate cascade steps to location-B followed by a PID scan.
Figure 17B:
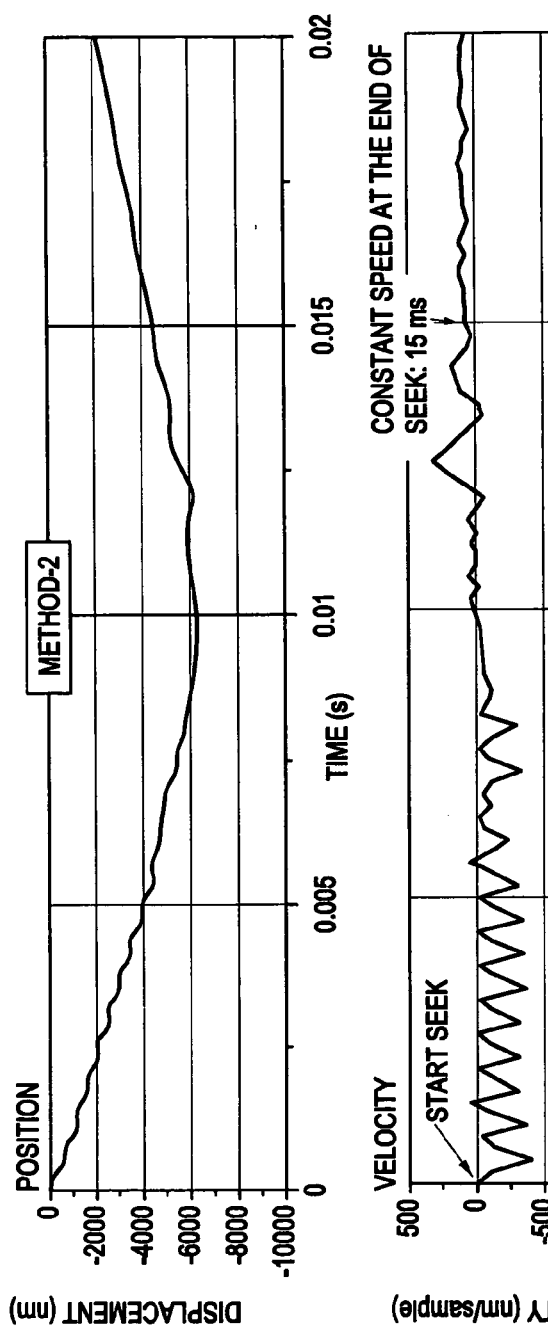
Figure 17C:
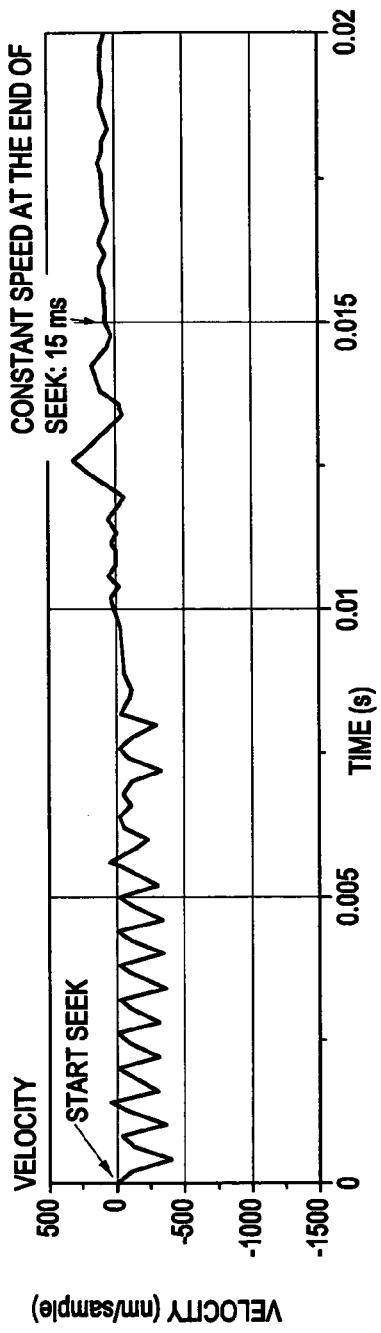
Figure 17D:
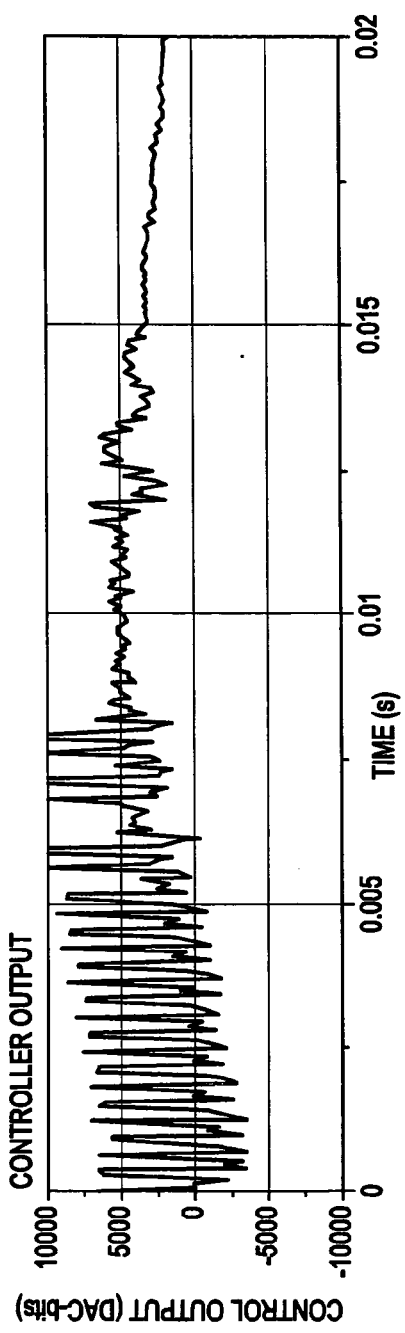

FIGS. 17B–17D correspond to position (repeat of FIG. 17A), velocity and current commands, respectively.

Figure 17E:
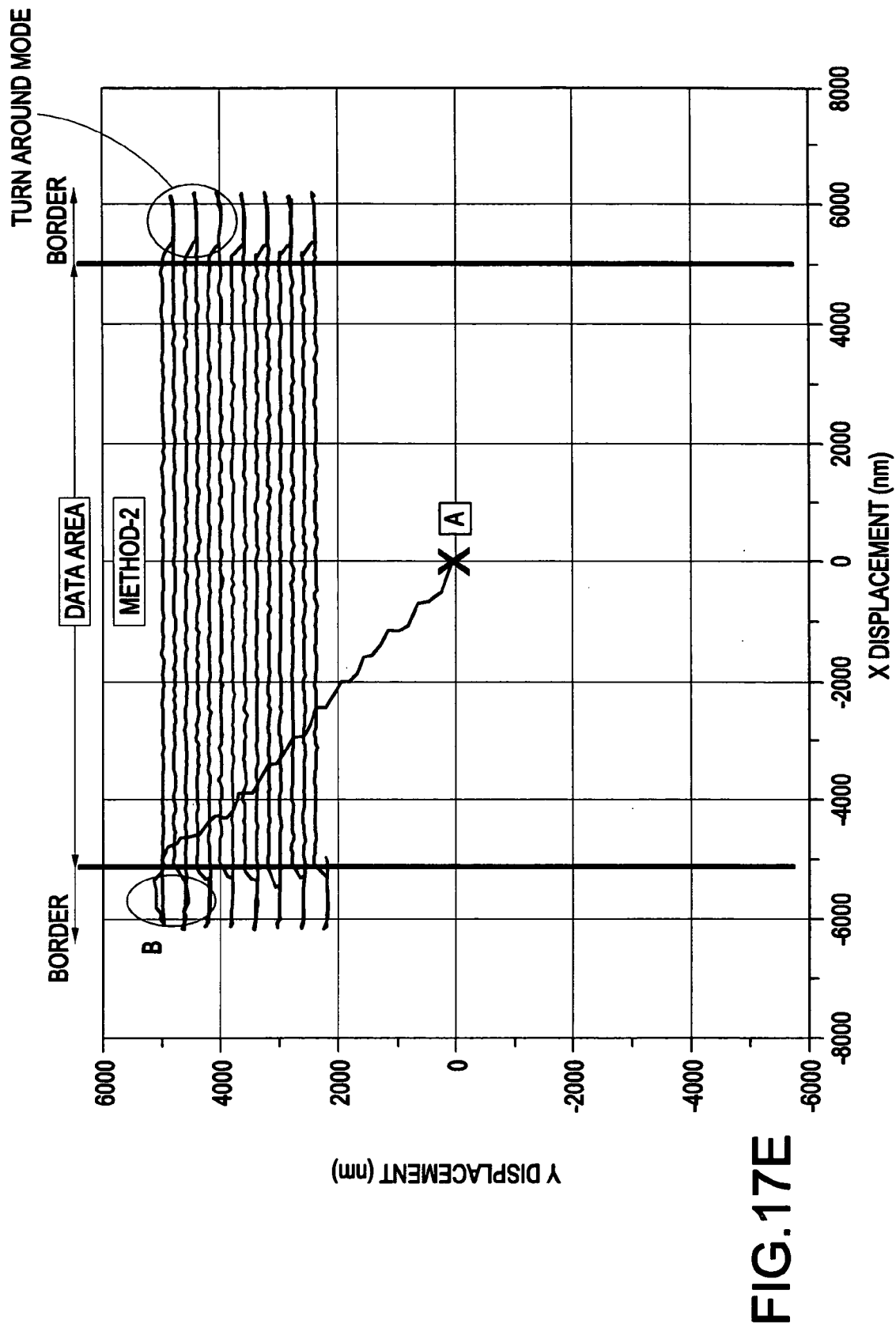

FIG. 17E shows the two-dimensional representation of the test results similar to that of FIG. 16E. The extended scan along many tracks separated by a 70-nm track pitch is demonstrated in this example. This configuration was studied before the stiffness counterbalance method was developed.

Without exploiting the knowledge of the scanner stiffness, the present inventors found that it was difficult to design a velocity controller (at a 5 kHz sampling rate) to encompass desirable seek-settling characteristics. The controller not only should accelerate and decelerate the scanner mass, but it also should build up a continuously increasing and rapidly leveling (near Location-B) counter force against the stiffness resistance. While the overshoot distance is minimized, the seek to scan time is lengthened to 15 ms. This is not a competitive tradeoff between border margins for overshoot vs. seek-scan time.

Thus, Method-1 is faster (11.5 ms) to reach the scan mode, but requires a large border area, whereas Method-2 uses less "real estate" (border or margin area) but is slower, requiring 15 ms (e.g., about 3.5 ms more than Method-1) to activate the scan mode.

FIGS. 18A–18E correspond to Method-3, which was designed to optimize the above-described methods (e.g., optimize both margin and time). Continuous velocity servo for seek and scan requires only 3 ms seek-scan time, and 0.5 μm border space for regaining the scan velocity. Method-3 produces the most competitive results in which both seek time and border (or margin) length is minimized.

Optimizing the transition from seek to track-follow-scan operations as accomplished by Method-3 uses two innovative steps.

A first step is the generation of a velocity profile for each X-seek. The velocity profile that normally would terminate at null velocity when the target distance approaches zero should be constructively modified to extend beyond zero as terminal velocity, and should impart a reverse velocity equal to that of the desired scan rate, and continue to maintain the scan rate until the end of the track is reached. (At the end of a track, the turn-around occurs. This is achieved by a step move by a Y-position servo, while the X-scan servo produces the same scan rate in the opposite direction.)

Figure 19:
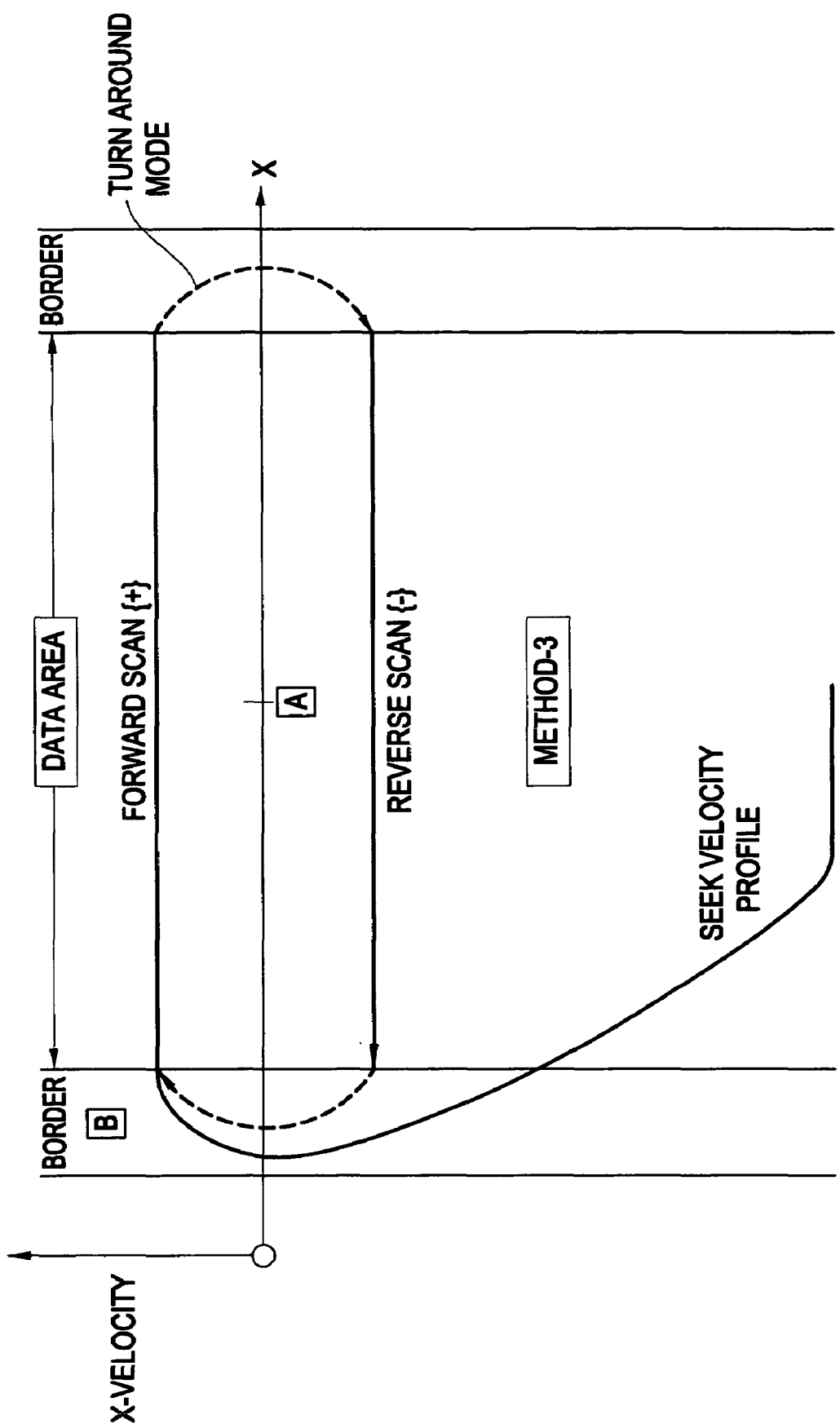
FIG. 19 illustrates a velocity profile and seek/track-follow-scan nodes.

A schematic of the velocity profile and modes of the X-Y controllers are shown in FIG. 19.

A second optimizing step is that of managing the "stiffness" problem. Higher sampling rates facilitate easy design tradeoffs. At sampling rates envisioned to be competitive, the seek controllers are found to require augmentation. The anticipated force to keep the scanner at equilibrium near Location-B can be computed from the knowledge of stiffness as discussed above.

Hence, to assist the acceleration (in -ve direction along the X axis) a step change in controller output equal to the equilibrium value is generated. The velocity estimator is activated by this control output in addition to the velocity servo output that attempts to follow the reference velocity profile.

Figure 18A:
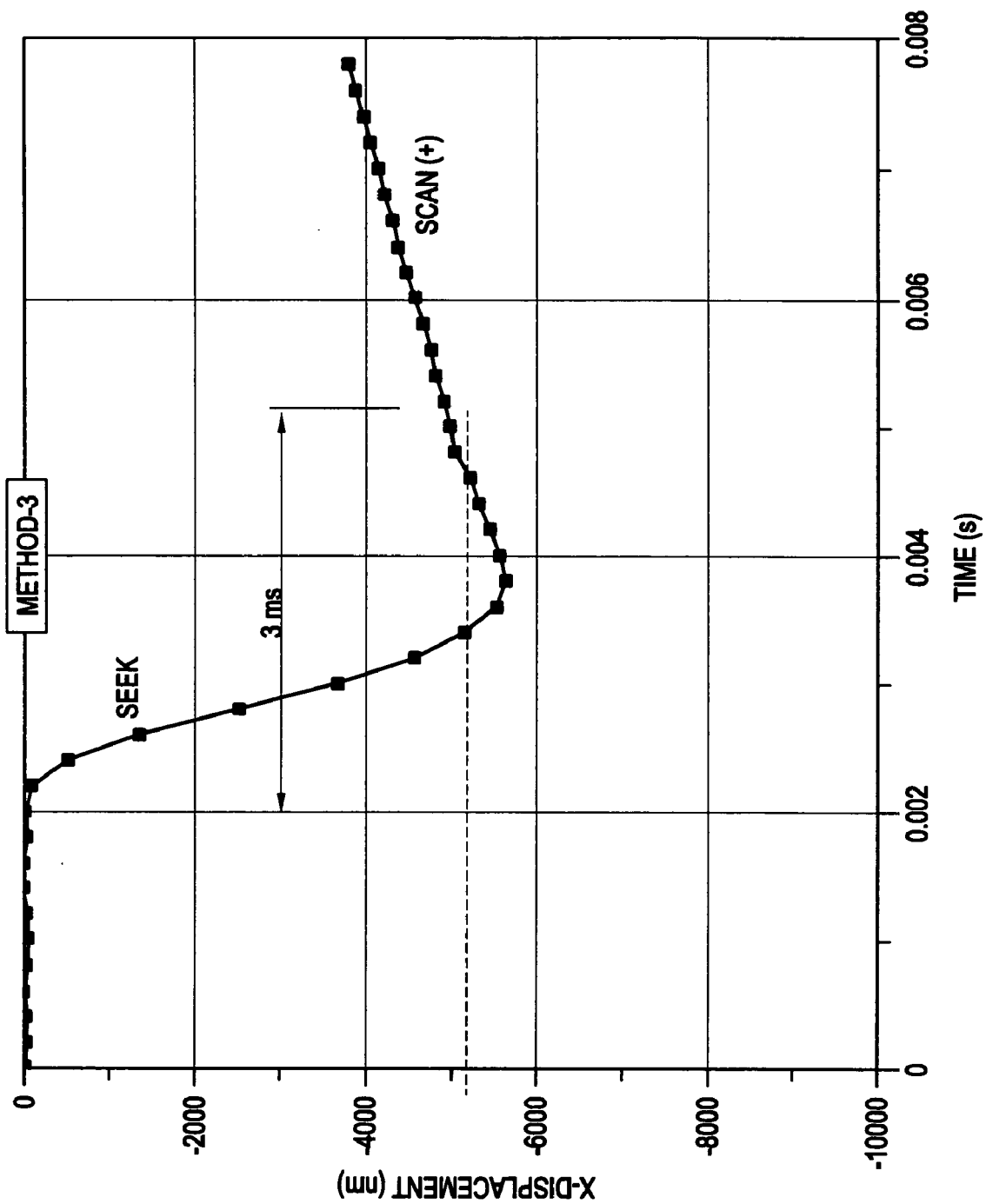
FIGS. 18A–18E illustrate a velocity servo seek to Location-B followed by a velocity servo scan with stiffness compensation.
Figure 18B:
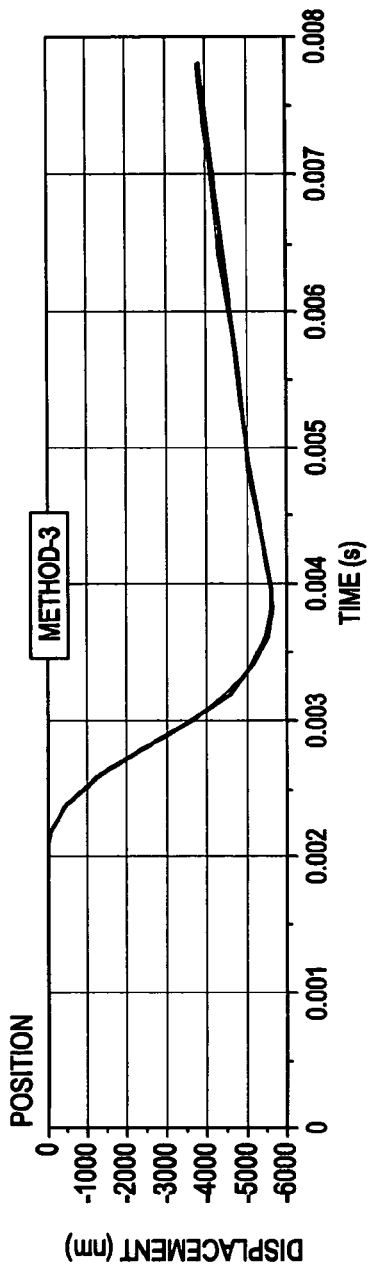

FIGS. 18A–18B show the X-seek and scan performance for a 5 μm move with different vertical scales. Five seek and scan operations are repeated to show the robustness of the access operation.

FIGS. 18A–18B show the time evolution of position from Location-A to Location-B along the X axis (-ve).

Figure 18C:
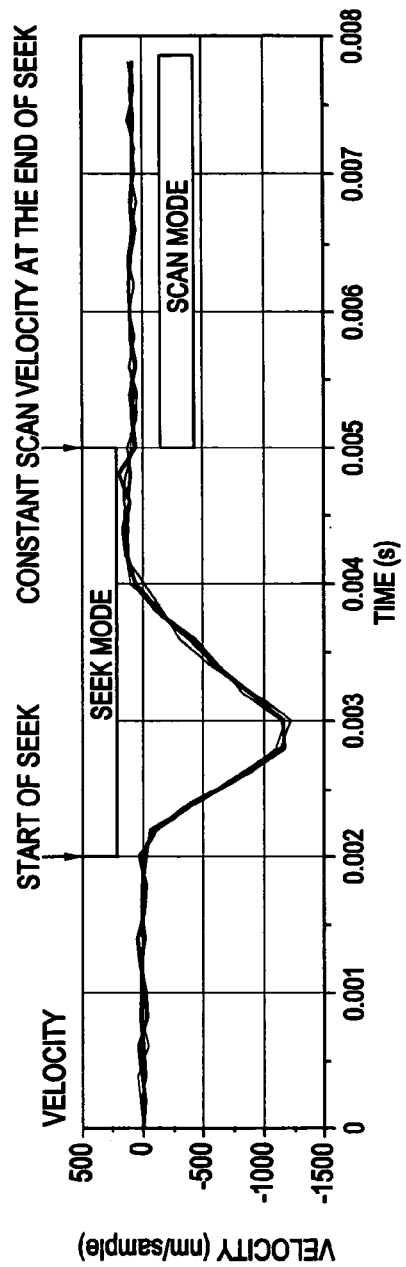

FIG. 18C shows the estimated velocity. It is observed that the peak velocity of 1250 nm/sample is achieved in 6 samples (1.2 ms), hardly enough for the controller to build up against the scanner's stiffness.

Figure 18D:
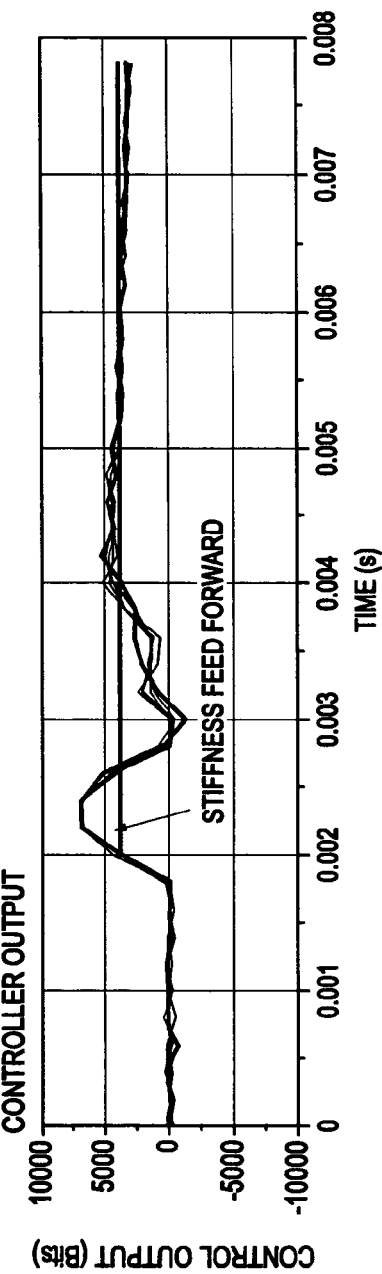

FIG. 18D shows the stiffness feed-forward output alone (e.g., a relatively powerful output current), and the velocity controller output when it is added to the stiffness feed forward output. The feedforward stiffness term allows the controller to adjust its behavior to the trajectory as exemplarily shown in FIG. 19. It is observed from this plot that the servo controller output (without the stiffness term) is positive for the first 3 samples, and negative for the next 7 samples in this example. The net actuator current is almost always in one direction, indicating that the deceleration is provided by the stiffness of the scanner alone. The velocity controller cushions the deceleration level by the spring so that the transition to scan-mode is achieved in limited samples. It has been demonstrated that a conservative seek time of 10–15 ms can be reduced to 3 ms through the two innovative steps demonstrated in the present invention.

The stiffness feed forward component can be optimized further by making it more complex. By stepping the output level in conjunction with the acceleration/deceleration/scan phases, the move time can be further reduced. This is a subject beyond the scope of the present invention. The switching criteria that will be universal for all seek lengths, especially when the X-Y dynamics are coupled, can be difficult to achieve and needs further effort.

Figure 18E:
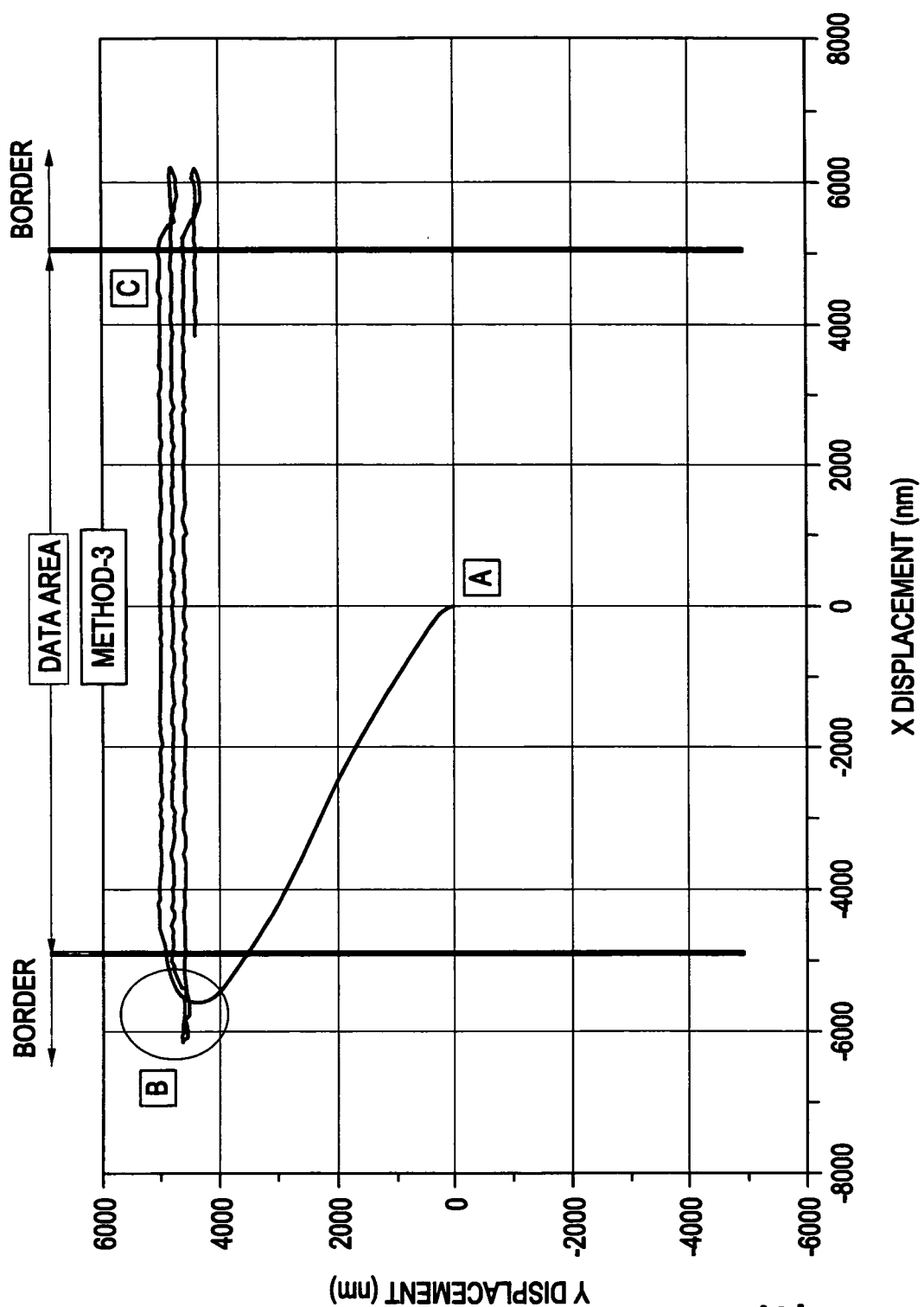

FIG. 18E, similarly corresponding to Method-3, illustrates the two-dimensional seek performance of the system of Method-3.

Thus, Method-3 implements the velocity trajectory along with the stiffness feedforward, as shown in FIG. 18D. In an exemplary embodiment, Method-3 preferably employs the system of FIG. 10 using Case-A, and in which the servo controller 1040 is fed with the reference velocity 1050, whereas Methods 1 and 2 in exemplary embodiments preferably employ X-position controller 512 (as opposed to the velocity controller). Obviously, other configurations are possible as would be known by one of ordinary skill in the art taking the present specification as a whole.

With the above-described unique and unobvious exemplary embodiments of the present invention, a servo structure is developed that augments a conventional control structure, including a proportional-integral-derivative (PID) type, so that the significant stiffness characteristics of a MEMS-based scanner are intelligently neutralized through an exemplary feed forward control method. Additionally, a feedback control method is described in which numerous advantages accrue.

Thus, as described above, the invention provides several examples of a new servo architecture which overcomes the effect of resistance generated by a system of flexural elements (i.e., that are integral to a MEMS-based scanner) so that two dimensional seek and track-following-scan performances are achieved.

Further, the present invention addresses a plurality of functions of a scanner developed for a AFM-based storage application, including a track-following-scan and a two-dimensional seek.

While the invention has been described in terms of several preferred embodiments, those skilled in the art will recognize that the invention can be practiced with modification within the spirit and scope of the appended claims.

Further, it is noted that, Applicant's intent is to encompass equivalents of all claim elements, even if amended later during prosecution.

What is claimed is:

1. A servo controller for controlling movement of a scanner, comprising:
    a servo unit for generating a first-axis motion and a second-axis motion under a track-follow-scan mode and a turn-around mode,
    wherein a scan rate is programmable by choosing an appropriate slope for a ramp trajectory for the servo unit when generating the first-axis motion,
    wherein said servo unit comprises:
    a first servo for the X-axis and a second servo for the Y-axis,
    wherein said first servo comprises:
    an analog-to-digital (A/D) converter for receiving position information signals of said scanner, and converting said position information signals to digital values;
    a digital controller including:
        a position controller for receiving an output from said A/D converter;
        a velocity estimator for receiving an output from said A/D converter;
        a velocity controller for receiving an output from said velocity estimator;
        a reference trajectory for providing an input to said velocity controller; and
        a post filter bank for receiving an output from one of said velocity controller and said position controller, to provide a control signal;
    a digital-to-analog (D/A) converter for receiving said control signal and generating an analog signal;
    a current amplifier for receiving said analog signal; and
    an actuator for receiving an output from said current amplifier to drive said scanner.

2. The system of claim 1, wherein the velocity estimator is designed optimally to have predetermined filtering characteristics.

3. A servo control system for a micro-electromechanical system (MEMS)-based motion control system, comprising:
    a motion generator having an inherent stiffness component;
    a feedback element for canceling the inherent stiffness component, and
    a node for providing an input to said motion generator and a stiffness element coupled to said node,
    wherein a term representing said inherent stiffness is fed through said stiffness element to said node to counterbalance the stiffness.

4. The system of claim 2, wherein said velocity estimator has a predetermined fast filtering capability at a cost of allowing larger noise peaks occurring in a waveform during a steady velocity.

5. The system of claim 2, wherein said velocity estimator has a predetermined slow filtering capability such that a waveform during a steady velocity is substantially uniform.

6. A method of controlling a scanner in a micro-electromechanical system (MEMS)-based motion control device, comprising:
    generating a velocity profile for each X-seek; and
    managing a stiffness of said scanner,
    wherein the velocity profile extends beyond zero as a terminal velocity, and imparts a reverse velocity equal to that of a desired scan rate, and continues to maintain the scan rate until an end of a track is reached,
    wherein at the end of a track, performing a turn-around, said performing comprising a step move performed by a Y-position servo, while an X-scan servo produces a same scan rate in an opposite direction.

7. A method of controlling a scanner in a micro-electromechanical system (MEMS)-based motion control device, comprising:
    generating a velocity profile for each X-seek; and
    managing a stiffness of said scanner,
    wherein the velocity profile extends beyond zero as a terminal velocity, and imparts a reverse velocity equal to that of a desired scan rate, and continues to maintain the scan rate until an end of a track is reached,
    wherein a step change in a controller output equal to the equilibrium value is generated, and
    wherein a velocity estimator is activated by the controller output in addition to a velocity servo output which substantially follows a reference velocity profile.

* * * * *